(12) United States Patent
Hamada et al.

(10) Patent No.: US 8,224,123 B2
(45) Date of Patent: Jul. 17, 2012

(54) METHOD FOR TRANSMITTING AND RECEIVING IMAGE, RECEIVING DEVICE, AND IMAGE STORAGE DEVICE

(75) Inventors: Koichi Hamada, Yokohama (JP); Masahiro Kageyama, Hino (JP); Shigeki Nagaya, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 990 days.

(21) Appl. No.: 12/200,195

(22) Filed: Aug. 28, 2008

(65) Prior Publication Data
US 2009/0080804 A1    Mar. 26, 2009

(30) Foreign Application Priority Data
Sep. 21, 2007 (JP) .................. 2007-244643

(51) Int. Cl.
*G06K 9/32* (2006.01)
*H04N 11/02* (2006.01)
(52) U.S. Cl. .................. 382/298; 382/299; 348/424.1
(58) Field of Classification Search .................. None
See application file for complete search history.

(56) References Cited

U.S. PATENT DOCUMENTS

| | | | | |
|---|---|---|---|---|
| 4,745,459 A * | 5/1988 | Ninomiya et al. | ......... | 348/431.1 |
| 4,868,654 A * | 9/1989 | Juri et al. | ......... | 375/240.21 |
| 4,979,037 A * | 12/1990 | Mizutani et al. | ......... | 375/240.21 |
| 5,612,748 A * | 3/1997 | Gohshi et al. | ......... | 375/240.21 |
| 5,621,468 A * | 4/1997 | Kim | ......... | 375/240.16 |
| 5,873,830 A * | 2/1999 | Hossack et al. | ......... | 600/447 |
| 6,023,535 A * | 2/2000 | Aoki | ......... | 382/299 |
| 6,134,373 A * | 10/2000 | Strolle et al. | ......... | 386/304 |
| 7,317,445 B2 * | 1/2008 | Hekstra et al. | ......... | 345/102 |
| 7,477,802 B2 * | 1/2009 | Milanfar et al. | ......... | 382/299 |
| 2006/0244759 A1 * | 11/2006 | Kempf | ......... | 345/611 |
| 2007/0126928 A1 * | 6/2007 | Klompnhouwer et al. | ... | 348/497 |
| 2009/0015710 A1 * | 1/2009 | Hirasawa et al. | ......... | 348/425.1 |

FOREIGN PATENT DOCUMENTS

| | | | |
|---|---|---|---|
| GB | 2438700 A | * | 12/2007 |
| JP | 08-336046 | | 12/1996 |
| JP | 9-069755 | | 3/1997 |
| JP | 2005-348320 | | 12/2005 |

OTHER PUBLICATIONS

Ricardo Alexander Frederik Belfor, "Subsampling methods for image sequence coding", PhD Thesis 1994.*
Aoki, Shin, "Super Resolution Processing by Plural Number of Lower Resolution Images," Ricoh Technical Report, pp. 19-25, No. 24, Nov. 1998 (with English version).

* cited by examiner

*Primary Examiner* — Li Liu
(74) *Attorney, Agent, or Firm* — McDermott Will & Emery LLP

(57) ABSTRACT

A technique is provided for reducing the size of each of images included in an image signal and generating a high-resolution image with minimized degradation in the image quality from the reduced images. Alias components and motion information that are included in the image signal having the reduced images are used for conversion of the images included in the image signal into a high-resolution image. Low pass filtering is performed on a frequency component in the direction of a motion included in the image signal and a frequency component in a direction other than the direction of the motion. The cut-off frequency of the low pass filter in the direction other than the direction of the motion is lower than the cut-off frequency of the low pass filter in the direction of the motion.

7 Claims, 11 Drawing Sheets

HORIZONTAL DIRECTION →

VERTICAL DIRECTION ↓

EXAMPLE OF LPF 1

| 0 | 0 | −1/8 | 0 | 0 |
|---|---|---|---|---|
| 0 | 0 | 1/4 | 0 | 0 |
| 0 | 0 | 3/4 | 0 | 0 |
| 0 | 0 | 1/4 | 0 | 0 |
| 0 | 0 | −1/8 | 0 | 0 |

EXAMPLE OF LPF 2

| 0 | 0 | 0 | 0 | 0 |
|---|---|---|---|---|
| 0 | 0 | 0 | 0 | 0 |
| −1/8 | 1/4 | 3/4 | 1/4 | −1/8 |
| 0 | 0 | 0 | 0 | 0 |
| 0 | 0 | 0 | 0 | 0 |

FIG.11
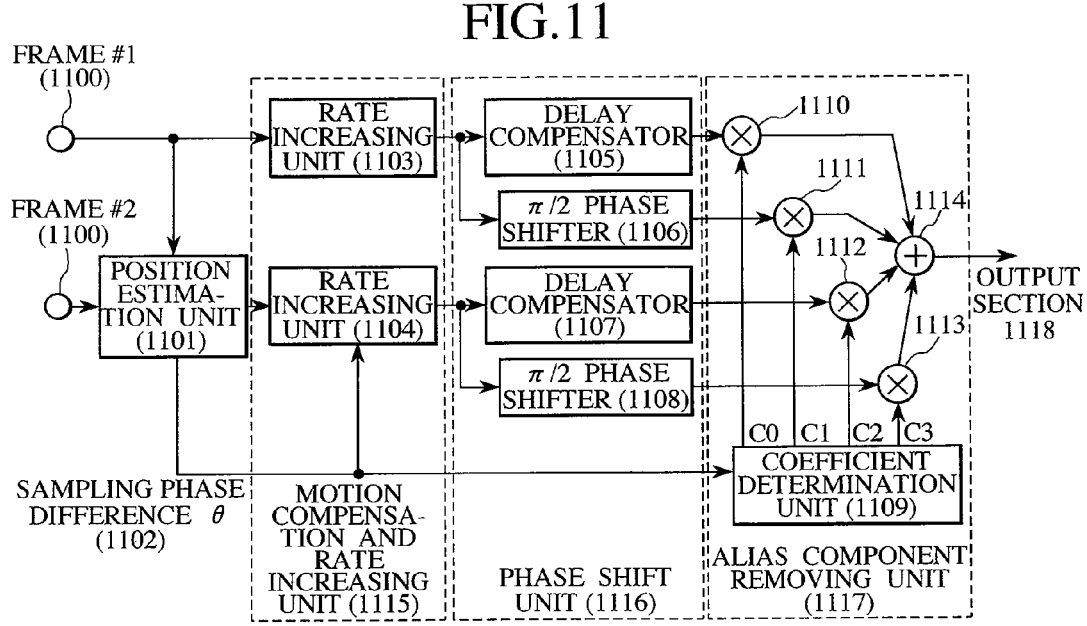
FIG.12A
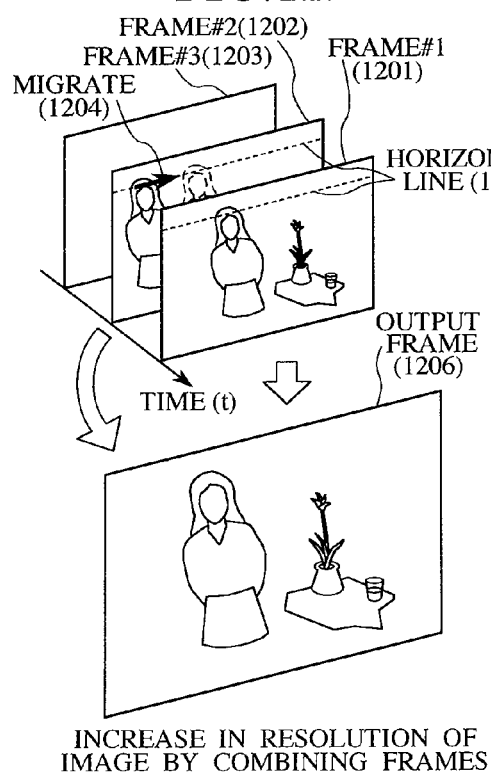
INCREASE IN RESOLUTION OF
IMAGE BY COMBINING FRAMES
FIG.12B
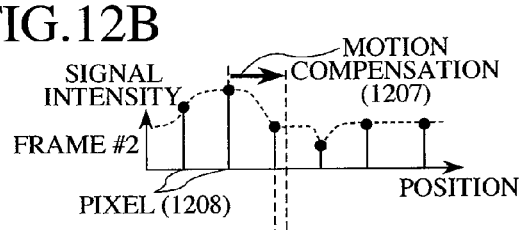
FIG.12C
FIG.12D
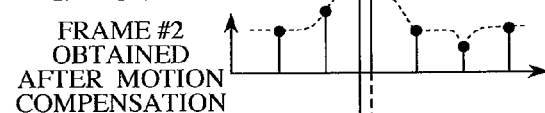
FIG.12E
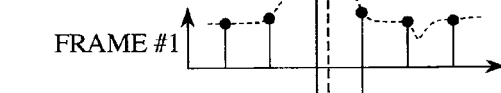
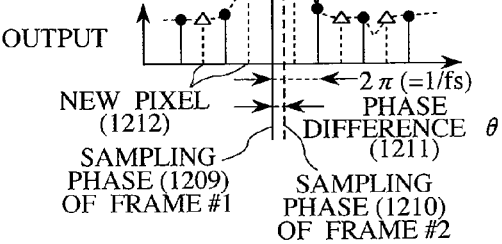

RELATIONSHIP OF
PHASES OF COMPONENTS

RELATIONSHIP OF
PHASES OF ORIGINAL
COMPONENTS

RELATIONSHIP OF
PHASES OF ALIAS
COMPONENTS

RELATIONSHIP OF
PHASES OF COMPONENTS

RELATIONSHIP OF
PHASES OF ORIGINAL
COMPONENTS

RELATIONSHIP OF
PHASES OF ALIAS
COMPONENTS

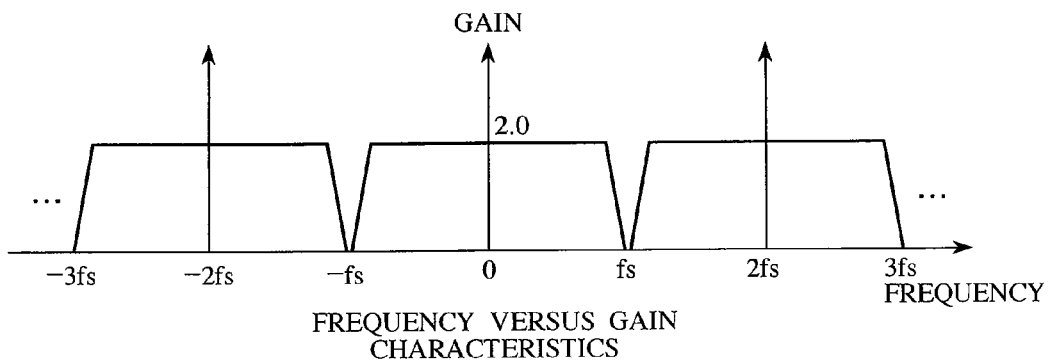
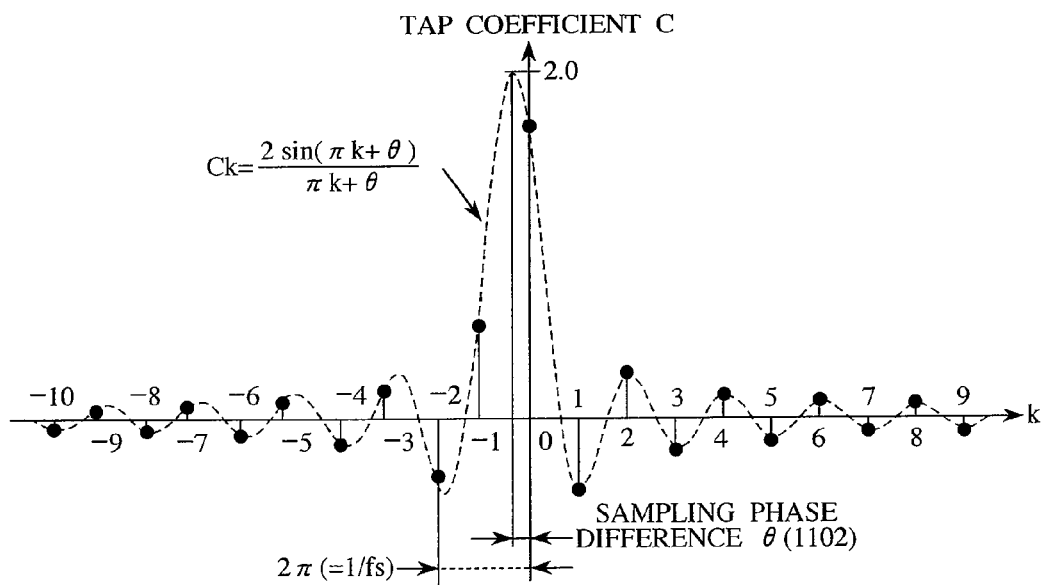

FREQUENCY VERSUS GAIN
CHARACTERISTICS

FREQUENCY VERSUS PHASE
DIFFERENCE CHARACTERISTICS

FIG.19A (1) TOTAL OF Re-AXIS COMPONENTS OF ORIGINAL COMPONENTS = 1
(2) TOTAL OF Im-AXIS COMPONENTS OF ORIGINAL COMPONENTS = 0
(3) TOTAL OF Re-AXIS COMPONENTS OF ALIAS COMPONENTS = 0
(4) TOTAL OF Im-AXIS COMPONENTS OF ALIAS COMPONENTS = 0

FIG.19B 

(1) $C0 + C2 = 1$
(2) $C1 + C3 = 0$
(3) $C0 + C2 \cdot \cos\theta - C3 \cdot \sin\theta = 0$
(4) $C1 + C2 \cdot \sin\theta + C3 \cdot \cos\theta = 0$

FIG.19C 

$C0 = 1/2$
$C1 = -(1+\cos\theta)/(2\sin\theta)$
$C2 = 1/2$
$C3 = (1+\cos\theta)/(2\sin\theta)$

FIG.19D

| $\theta$ | C0 | C1 | C2 | C3 |
|---|---|---|---|---|
| 0 | 0.5 | — | 0.5 | — |
| $\pi/8$ | 0.5 | −2.51 | 0.5 | 2.51 |
| $2\pi/8$ | 0.5 | −1.21 | 0.5 | 1.21 |
| $3\pi/8$ | 0.5 | −0.75 | 0.5 | 0.75 |
| $4\pi/8$ | 0.5 | −0.5 | 0.5 | 0.5 |
| $5\pi/8$ | 0.5 | −0.33 | 0.5 | 0.33 |
| $6\pi/8$ | 0.5 | −0.21 | 0.5 | 0.21 |
| $7\pi/8$ | 0.5 | −0.1 | 0.5 | 0.1 |
| $8\pi/8$ | 0.5 | 0 | 0.5 | 0 |
| $9\pi/8$ | 0.5 | 0.1 | 0.5 | −0.1 |
| $10\pi/8$ | 0.5 | 0.21 | 0.5 | −0.21 |
| $11\pi/8$ | 0.5 | 0.33 | 0.5 | −0.33 |
| $12\pi/8$ | 0.5 | 0.5 | 0.5 | −0.5 |
| $13\pi/8$ | 0.5 | 0.75 | 0.5 | −0.75 |
| $14\pi/8$ | 0.5 | 1.21 | 0.5 | −1.21 |
| $15\pi/8$ | 0.5 | 2.51 | 0.5 | −2.51 |

METHOD FOR TRANSMITTING AND RECEIVING IMAGE, RECEIVING DEVICE, AND IMAGE STORAGE DEVICE

CLAIM OF PRIORITY

The present application claims priority from Japanese patent application serial No. JP 2007-244643, filed on Sep. 21, 2007, the content of which is hereby incorporated by reference into this application.

BACKGROUND OF THE INVENTION (1) Field of the Invention

The present invention relates to a technique for reducing the size of an image and enlarging the image after the reduction.

(2) Description of the Related Art

It is known that JP-A-2005-348320 discloses a typical one of techniques for reducing the size of an image and restoring the image after the reduction.

It is also known that Non-Patent Document 1 (Shin Aoki: "Super Resolution Processing By Plural Number of Lower Resolution Images", Ricoh Technical Report, pp. 19-25, No. 24, November, 1998) discloses a super resolution technique as a technique for generating an image having increased resolution from plural images including alias components.

SUMMARY OF THE INVENTION

The technique disclosed in Non-Patent Document 1 is capable of increasing resolution of an image only in the direction in which a subject moves. In the conventional technique, although image resolution in the horizontal direction in which the subject moves can be increased, image resolution in the vertical direction cannot be increased, as shown in FIG. 5.

In such a technique for increasing resolution of an image as described in Non-Patent Document 1, which restores the image after the reduction in the size of the image, when the size of the image is reduced by pixel subsampling, an alias component is included in the reduced image in an image reduction process. In this case, the alias component remains as noise in a frequency component (of an image signal including the image obtained after the increase in the resolution) in a direction in which resolution cannot be increased. For example, the alias component appears as noise to reduce the quality of the image.

In addition, when a spatially invariant low pass filter is used for a reduction in the size of an image, a high-resolution image cannot be generated even if the super resolution processing technique described in Non-Patent Document 1 is used.

To solve the problem, the following processing is performed according to an aspect of the present invention. That is, the size of each of images included in an image signal is reduced, and the image signal is converted into a high-resolution image by using an alias component and information on a motion of a subject included in the images. The alias component and the information are included in the image signal having the reduced images.

Then, low pass filtering is performed to cut a high frequency component in the direction of the motion included in the image signal. In this case, the cut-off frequency of the low pass filter for the image signal in the direction other than the direction of the motion is lower than the cut-off frequency of the low pass filter for the image signal in the direction of the motion.

According to the aspect of the present invention, a high-resolution image can be generated from reduced images, with minimized degradation in the image quality.

BRIEF DESCRIPTION OF THE DRAWINGS

These and other features, objects and advantages of the present invention will become more apparent from the following description when taken in conjunction with the accompanying drawings wherein:

FIG. 11 is a diagram showing an example of the configuration of an image resolution increasing unit according to the first embodiment;

FIGS. 12A to 12E are diagrams showing processing for increasing resolution according to the first embodiment;

FIG. 15 is a graph explaining a rate increasing unit according to the first embodiment;

FIG. 16 is a graph explaining the rate increasing unit according to the first embodiment;

FIGS. 19A to 19D are diagrams explaining a coefficient determination device according to the first embodiment.

DESCRIPTION OF THE PREFERRED EMBODIMENTS

Figure 1:
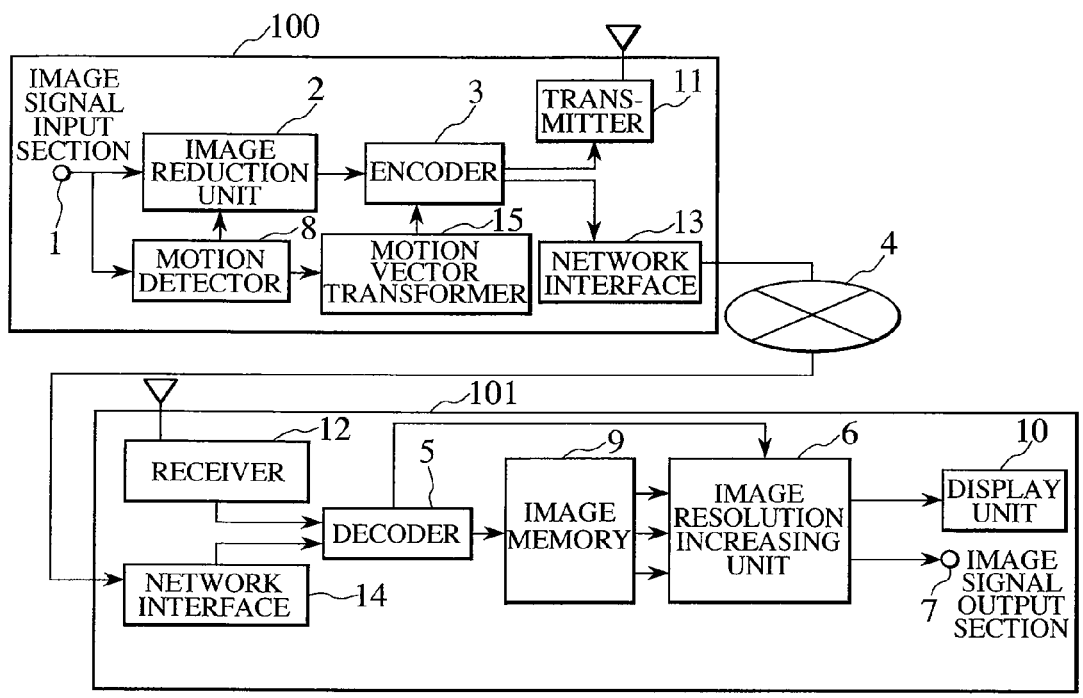
FIG. 1 is a diagram showing an example of the configuration of an image transmission/reception system according to a first embodiment of the present invention.

An embodiment of the present invention will be described with reference to the accompanying drawings.

In the drawings, constitutional elements denoted by the same reference numeral have the same function(s).

The meaning of the "phase" of an image signal includes the meaning of a "location" in the image signal in the description in the present specification and the accompanying drawings.

First Embodiment

Referring to FIG. 1, a transmitting device 100 includes an image signal input section 1, an image reduction unit 2, encoder 3, a motion detector 8, a transmitter 11, a network interface 13, and a motion vector transformer 15. The image reduction unit 2 receives an image signal from the image signal input section 1 and reduces the size of an image(s) included in the image signal. The rate (image reduction rate) of the reduction in the size of the image can be changed based on performance of an image resolution increasing unit 6 or a demanded quality of the image to be output. The image resolution increasing unit 6 is provided on the downstream side of the image reduction unit 2.

In the first embodiment described below, the length and width of the image(s) included in the image signal are reduced by, for example, half by the image reduction unit 2.

In the above case, the motion detector 8 also receives the image signal from the image signal input section 1 and calculates a motion vector(s) included in the image signal. The image reduction unit 2 performs low pass filtering based on the motion vector(s) calculated by the motion detector 8. The operations of the image reduction unit 2 and the operations of the motion detector 8 are described later.

The image signal including the image(s) reduced by the image reduction unit 2 is encoded, for example, by the encoder 3. When the size of the image(s) is reduced before the encoding, it can be expected that an image compression rate is increased (data to be encoded has a small amount of bits). Image encoding schemes including MPEG-2 and MPEG-4 have been widely known as a method for encoding an image signal in order to transmit and store the image signal. In the present embodiment, the compression rate of an image signal can be increased by using any of the image encoding schemes as described above. Any of the image encoding schemes may be used as long as the compression rate of an image signal is increased in the present embodiment.

When the encoder 3 uses a motion vector(s) for encoding an image signal, the encoder 3 performs motion detection to obtain the motion vector(s). The encoder 3 uses the obtained motion vector(s) to encode the image signal and then generate a bit stream. In this case, the generated bit stream includes the motion vector(s) and the image signal.

In another example of the configuration of the image transmission/receiving system, information on the motion vector(s) calculated by the motion detector 8 based on a motion included in an image signal may be used. In this case, the size of the image included in the image signal used for the calculation of the motion vector(s) by the motion detector 8 is different from the size of the image included in an image signal to be encoded by the encoder 3. The motion vector transformer 15 changes the number of the motion vectors (generated by the motion detector 8) and the length of each of the motion vectors based on the image reduction rate of the image reduction unit 2 to generate a motion vector(s) that can be used by the encoder 3. When the encoder 3 uses the motion vector(s) generated by the motion vector transformer 15, motion detection processing to be performed by the encoder 3 is not necessary. This results in a reduction in the amount of data to be processed.

In the transmitting device 100, the image data encoded by the encoder 3 is then transmitted from the encoder 3 to the transmitter 11 or to a receiving device 101 through the network interface 13.

When the transmitting device 100 is a device for broadcast station or the like, for example, the transmitter 11 transmits the image data to the receiving device 101 by means of a radio wave or the like.

When the transmitting device 100 is an image distribution server, a transmitter for Internet Protocol Television or the like, the network interface 13 transmits the image data through a network 4 to the receiving device 101.

The receiving device 101 includes a receiver 12, a network interface 14, a decoder 5, an image memory 9, the image resolution increasing unit 6, an image signal output section 7, and a display unit 10. In the receiving device 101, the encoded image data is transmitted from the transmitter 11 and received by the receiver 12 or is transmitted from the network interface 13 and received by the network interface 14.

When the receiving device 101 is a broadcasting receiver or the like, the encoded image data transmitted by means of a radio wave or the like is received by the receiver 12.

When the receiving device 101 is a client of an image distribution server, a receiver for Internet Protocol Television or the like, the network interface 14 receives the encoded image data transmitted through the network 4.

The decoder 5 decodes the received encoded image signal. The image signal decoded by the decoder 5 is stored in the image memory 9. The image resolution increasing unit 6 generates an image having increased resolution from the multiple images included in the image signal stored in the image memory 9. In this case, the image resolution increasing unit 6 performs processing for increasing resolution (processing for converting the image signal into a high-resolution image) by using an alias component(s) and a difference between positions of a subject included in the images. The processing for increasing the resolution will be described later.

The image resolution increasing unit 6 transmits the image having increased resolution to the display unit 10 or the image signal output section 7. The display unit 10 receives the image from the image resolution increasing unit 6 and displays the image. The image signal output section 7 receives the image from the image resolution increasing unit 6 and outputs the image to another device.

Next, the image reduction unit 2 provided in the transmitting device 100 according to the first embodiment will be described with reference to FIG. 2.

The image reduction unit 2 has a plurality of low pass filters 21 and a selector 22. The image signal received by the image reduction unit 2 is input in parallel to the plurality of spatial low pass filters 21 having respective characteristics different from each other. Each of the low pass filters 21 outputs a signal to the selector 22. The selector 22 receives the signals from the low pass filters 21 and selects one of the received signals. The selector 22 outputs the selected signal.

The image signal received by the image reduction unit 2 is also transmitted to the motion detector 8. The motion detector 8 detects a motion vector for each of pixels (pixel values) included in the image signal, and outputs information (motion vector information) on the motion vectors to the selector 22. The selector 22 selects one of the signals output from the low pass filters 21 based on the motion vector information.

The selector 22 subsamples the pixels to reduce the size of the image. In the first embodiment, the selector 22 outputs a pixel value to an image output section 25 for each pixel and each line to reduce the length and width of the image by half. To reduce the size of the image at a rate different from that in the abovementioned case, the selector 22 may subsample the pixels at a rate different from that in the abovementioned case.

Next, a description will be made of operations of the selector 22 based on characteristics of the plurality of low pass filters 21. The low pass filters 21 have respective different characteristics of directions and frequency ranges to be limited. For example, the low pass filter (LPF) 1 (which is one of the low pass filters 21) blocks a high frequency component (of the received image signal) in the vertical direction to reduce the frequency range of the image signal by half and does not block a frequency component (of the received image signal) in the horizontal direction. The low pass filter (LPF) 2 (which is another one of the low pass filters 21) blocks a high frequency component (of the received image signal) in the horizontal direction to reduce the frequency range of the image signal by half and does not block a frequency component (of the received image signal) in the vertical direction.

Figures 3, 4:
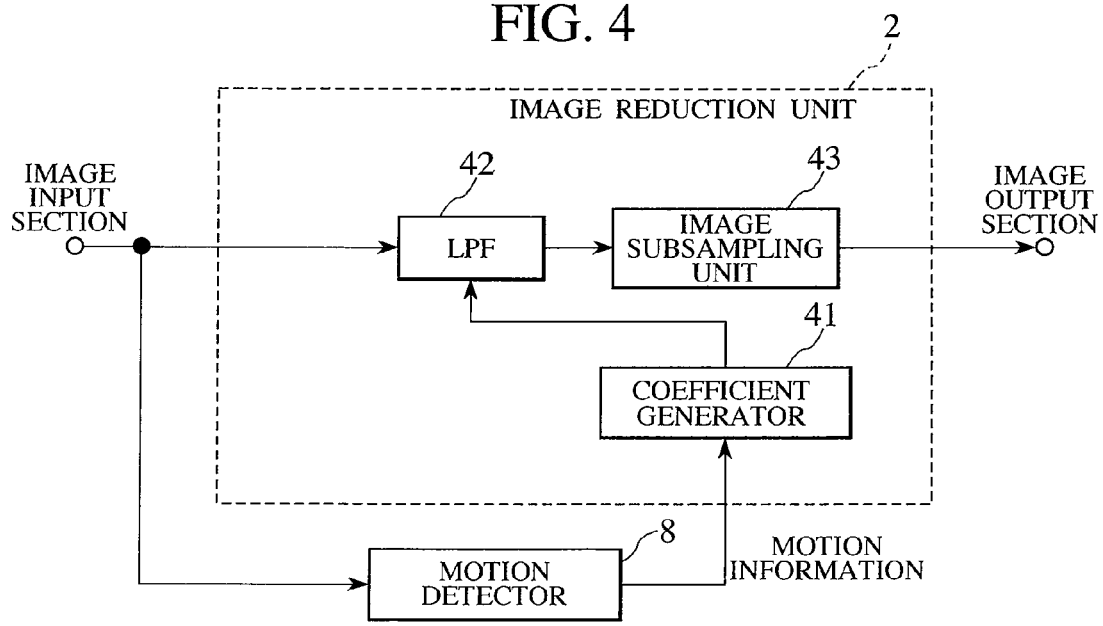
FIG. 3 is a diagram showing an example of coefficients of low pass filters according to the first embodiment.
FIG. 4 is a diagram showing another example of the configuration of the image reduction unit according to the first embodiment.
Figure 5:
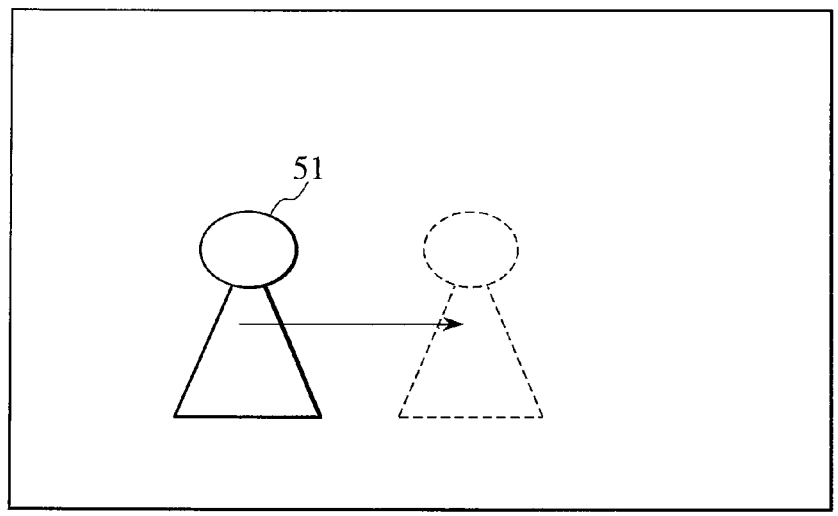
FIG. 5 is a diagram showing an example of an image of a subject moving in the horizontal direction.

FIG. 3 shows an example of coefficients of the low pass filters 1 and 2 in the above case. The selector 22 operates to select signals output from the low pass filter 1 for pixels representing a subject 51 (shown in FIG. 5) moving only in the horizontal direction. This results from the fact that since the image resolution increasing unit 6 increases the resolution by using the difference between positions of a subject, resolution only in the direction in which the subject moves can be increased. In this case, therefore, resolution in the vertical direction in which the subject does not move is not increased.

The selector 22 according to the first embodiment uses an appropriate one or more of the low pass filters 21 to limit the frequency range of a frequency component (of the received image signal) in a direction in which a subject does not move, or a direction perpendicular to a direction in which the subject moves, i.e., the vertical direction, before subsampling the pixels.

In this case, the selector 22 according to the first embodiment does not perform low pass filtering on a frequency component (of the received image signal) in a direction in which the subject moves, i.e., the horizontal direction before subsampling the pixels. Alternatively, the selector 22 performs low pass filtering on the received image signal to cut a high frequency component (in the vertical direction). In this case, the cut-off frequency in the horizontal direction is higher than the cut-off frequency in the vertical direction, and a reduction in alias components is small.

Since the selector 22 performs the abovementioned processing, the transmitting device 100 outputs an image signal including an alias component in the direction which a subject moves and the reduced amount of alias components in a direction in which no subject moves. In addition, after the size of the image(s) is reduced, data on the reduced image(s) is transmitted by the transmitting device 100. This results in a reduction in the amount of data to be transmitted. The transmitting device 100 is therefore capable of outputting an image signal including a larger number of images even when a frequency range used for data transmitted by the transmitter 11 or a communication band used by the network interface 14 is limited.

In the receiving device 101 that receives the data on images from the transmitting device 100, the image resolution increasing unit 6 increases resolution in the direction of a motion of a subject based on the difference between the positions of the subject included in the images and alias components included in the data. The increase in the resolution makes it possible to reduce the number of alias components in the direction of the motion of the subject.

Since an appropriate one or more of the low pass filters 21 is used to limit the frequency range of a frequency component (of the image signal) in a direction in which no subject moves, the frequency range of the image signal output from the transmitting device 100 is limited.

The image resolution increasing unit 6 is therefore capable of reducing alias components in the direction in which a subject moves and alias components in a direction in which no subject moves. In addition, the image resolution increasing unit 6 is capable of generating an image having higher resolution than that of the images included in the image signal output from the transmitting device 100 and outputting the generated image.

Briefly, in the image transmission/reception system according to the first embodiment, which has the transmitting device 100 and the receiving device 101, the transmitting device 100 reduces the size of the image(s) to reduce the amount of data to be transmitted, and the receiving device 101 decodes the image(s) and generates an image having higher resolution. The receiving device 101 then restores the image. In this case, the receiving device 101 is capable of reducing alias components included in the image obtained after the resolution is increased, and preventing degradation in the image quality due to noise or the like.

The pixels representing the subject moving only in the horizontal direction are described above with reference to FIG. 2. Pixels representing a subject moving in the vertical direction or in a direction oblique to the vertical and horizontal directions, however, may be applied to the first embodiment.

The selector 22 may perform low pass filtering on the image signal to cut high frequency component of the image signal. The selector 22 may not perform low pass filtering on a frequency component in the direction of the motion of the subject and may perform low pass filtering on the image signal to cut high frequency component (of the image signal) in a direction perpendicular to the direction of the motion of the subject.

The above processing performed by the selector 22 makes it possible to adjust the amount of alias components (or to cause a small amount of alias components to remain) in a direction in which no subject moves.

Figure 2:
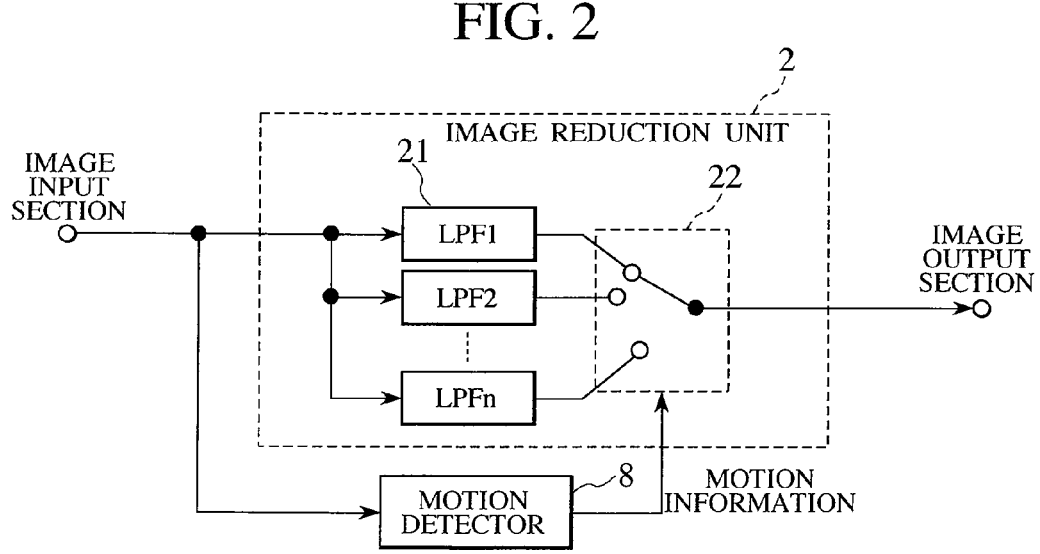
FIG. 2 is a diagram showing an example of the configuration of an image reduction unit according to the first embodiment.

The spatial low pass filters 21 according to the first embodiment may be different in type from each other depending on the number of spatial directions of an image, as shown in FIG. 2. The low pass filters 21 outputs respective signals, and the selector 22 selects one of the signals output from the low pass filters 21 based on the directions of the motion vectors included in the motion vector information output from the motion detector 8. This makes it possible to reduce alias components included in the image obtained after the image resolution increasing unit 6 increases the resolution.

When the images do not include any motion (the motion vectors are equal to zero), or when the amount of a motion of a subject included in the images is on the basis of integer pixels, the image resolution increasing unit 6 cannot increase the resolution. In this case, the selector 22 may select a signal output from a spatially invariant low pass filter that performs low pass filtering regardless of the direction of a motion of a subject. In addition, the spatially invariant low pass filter may be used even when the values of the motion vectors are not equal to zero or are not equal to the amount of an integer pixel(s) (or even when the values of the motion vectors are close to zero or are nearly equal to the amount of an integer pixel(s)).

The image reduction unit 2 according to the first embodiment may have a configuration shown in FIG. 4. The image reduction unit 2 shown in FIG. 4 includes a coefficient generator 41, a spatial low pass filter 42, and a pixel subsampling unit 43. The coefficient generator 41 receives the motion vector information from the motion detector 8 and generates a coefficient(s) based on the received motion vector information. A spatial low pass filter 42 shown in FIG. 4 is different from the low pass filters 21 shown in FIG. 2. The spatial low pass filter 42 switches a set coefficient(s) to the coefficients generated by the coefficient generator 41. The coefficients correspond to the low pass filters 1, 2 and the like (low pass filters 21) shown in FIG. 1. The pixel subsampling unit 43 subsamples pixels in order to reduce the size of each image.

In the abovementioned way, the coefficient generator 41, the spatial low pass filter 42, and the pixel subsampling unit 43 in FIG. 4 can achieve operations similar to those performed by the spatial low pass filters 21 and the selector 22 shown in FIG. 2. In the image reduction unit 2 having the configuration shown in FIG. 4, a plurality of spatial low pass filters is not required. The image reduction unit 2 shown in FIG. 4 can be achieved with a simpler hardware configuration.

Next, a description will be made of the processing for increasing resolution by the image resolution increasing unit 6 included in the receiving device 101 according to the first embodiment. In the following description, it is assumed that a plurality of images input to the image resolution increasing unit 6 according to the first embodiment is a plurality of frames (image frames).

First, the image resolution increasing unit 6 performs, for example, three types of processing, (1) position estimation, (2) wide frequency range interpolation, and (3) weighted sum, to perform processing for increasing resolution. The position estimation (1) is to use image data pieces included in the respective input image frames and estimate a difference between sampling phases of the image data pieces (positions of sampled image data pieces). The wide frequency range interpolation (2) is to use a wide band low pass filter for passing the image data pieces, alias components, and all high frequency components included in the original image signal in order to interpolate pixels (sampling points) and increase the pixel densities of the image data pieces. The weighed sum (3) is to use weighting coefficients obtained based on the sampling phases of the high-density data pieces in order to cancel and remove alias components generated due to the pixel sampling, and restore high frequency components of the original image signal.

FIGS. 12A to 12E show an outline of the technique for increasing resolution. In FIG. 12A, it is assumed that the image resolution increasing unit 6 receives a frame #1(1201), a frame #2(1202), and a frame #3(1203), which are present at different times from each other on the time axis, and combines the frames #1 to #3 to obtain a frame (1206) to be output. For the sake of simplicity, it is assumed that a motion (1204) of a subject occurs in the horizontal direction and one-dimensional signal processing is performed on data on a horizontal line (1205) shown in FIG. 12A to perform the processing for increasing resolution. In this case, the position of a signal waveform of the frame #1(1201) is different from the position of a signal waveform of the frame #2(1202) depending on the amount of the motion (1204) of the subject, as shown in FIGS. 12B and 12D. The difference of the positions is calculated by the position estimation (1) described above. In order to eliminate the difference between the positions of the signal waveforms, motion compensation (1207) is performed on the frame#2(1202), as shown in FIG. 12C. The phase difference θ (1211) between sampling phases (1209) and (1210) of pixels (1208) of the frames is calculated. The wide frequency range interpolation (2) and the weighted sum (3) are performed based on the phase difference θ (1211). As shown in FIG. 12E, each of new pixels (1212) is created at a central position phase difference (θ=π) between original pixels (1208) to increase the resolution. The weighted sum (3) will be described later. Although the subject may not only move in the horizontal direction, but also rotate, be enlarged, or be reduced, a minute motion or slow motion of the subject can be approximated to a locally horizontal motion.

In this case, the image resolution increasing unit 6 has a first configuration that is the same as one of configurations (for performing high resolution processing) described in JP-A-8-336046, JP-A-9-69755, and Non-Patent Document 1. To perform the weighted sum (3) in the case where the image resolution increasing unit 6 has the first configuration, the image resolution increasing unit 6 can use at least three signals of image frames as shown in FIG. 13. In this case, it is possible to obtain resolution larger by twice than that of the images in a one-dimensional direction.

Figure 13A:
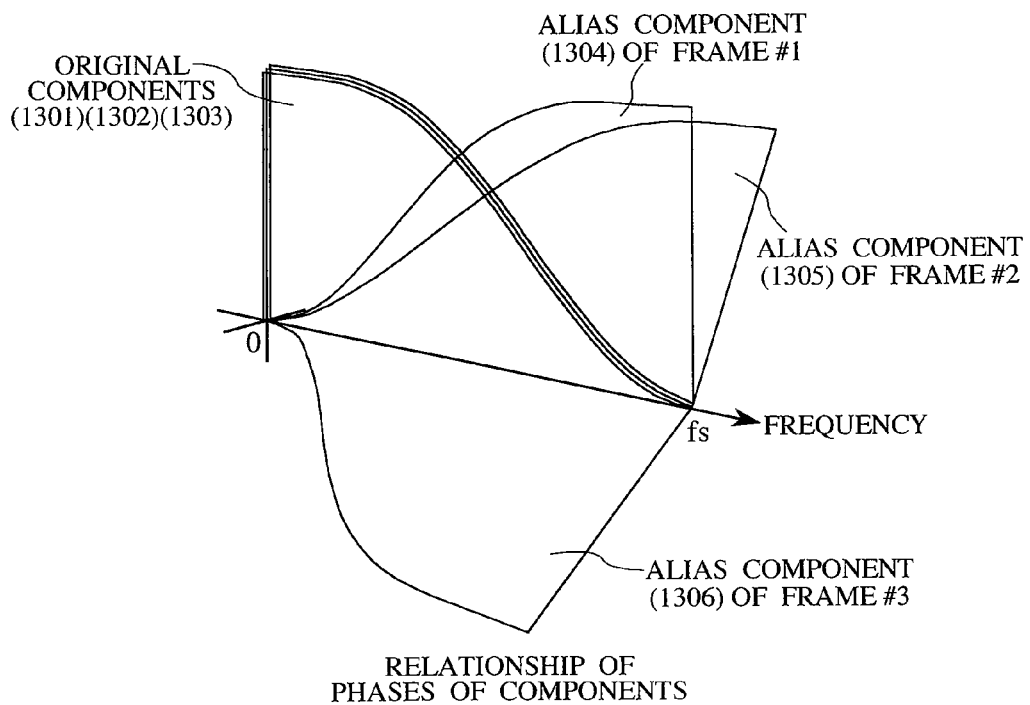
FIGS. 13A to 13C are diagrams showing the processing for increasing resolution according to the first embodiment.
Figure 13B:
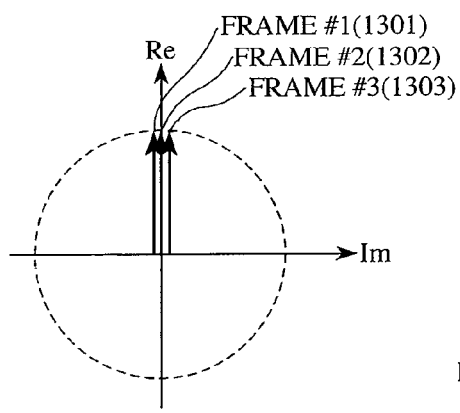
Figure 13C:
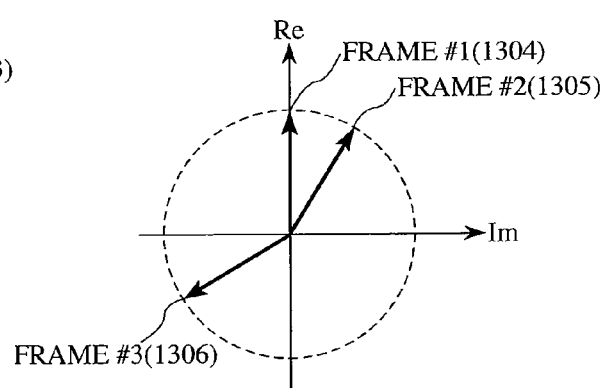

Next, a description will be made of the processing for increasing resolution by the image resolution increasing unit 6 having the first configuration with reference to FIGS. 13A to 13C. FIGS. 13A to 13C show frequency spectrums of frequency components in a one-dimensional frequency domain. In FIGS. 13A to 13C, the distance from a frequency axis indicates a signal intensity, and a rotation angle centering on the frequency axis indicates a phase. The weighted sum (3) will be described below.

In the wide frequency range interpolation (2), wide range low pass filtering is performed to pass a frequency component within a frequency range (from a frequency of 0 Hz to the sampling frequency fs) larger by twice than that from a frequency of 0 Hz to the Nyquist frequency (half of the sampling frequency) in order to interpolate the pixels. After the pixel interpolation, the sum of the components (hereinafter called as original components) that are the same as those of the original image signal and alias components generated depending on the sampling phases can be obtained. It is well known that when the wide frequency range interpolation (2) is performed on the signals of the three frames in the above case, the phases of the original components (1301), (1302), and (1303) of the frames are identical to each other as shown in FIG. 13A, and the phases of the alias components (1304), (1305), and (1306) are shifted depending on differences between the sampling phases of the frames. To easily understand the relationship of the phases, the relationship of the phases of the original components of the frames is shown in FIG. 13B, and the relationship of the phases of the alias components of the frames is shown in FIG. 13C.

Coefficients to be multiplied by the signals of the three frames are appropriately selected to perform the weighted sum (3). Therefore, the alias components (1304), (1305), and (1306) of the frames can be cancelled out each other and removed. Only the original components can be extracted. In this case, the vector sum of the alias components (1304), (1305), and (1306) of the frames is equal to zero. That is, in order to set both components in the direction of a Re axis (real axis) and components in the direction of an Im axis (imaginary axis) to be zero, at least three alias components are required. When at least three signals of frames are used, the resolution can be increased by twice, i.e., a single alias component can be removed.

FIG. 11 shows a second configuration of the image resolution increasing unit 6. The image resolution increasing unit 6 having the second configuration is capable of increasing resolution in a one-dimensional direction by twice when at least two signals of frames are used.

The image resolution increasing unit 6 includes an input section 1100, a position estimation unit 1101, a motion compensation and rate increasing unit 1115, a phase shift unit 1116, an alias component removing unit 1117, and an output section 1118. The input section 1100 receives a plurality of images included in an image signal from the image memory 9 shown in FIG. 1. The position estimation unit 1101 uses a sampling phase (sampling position) of a pixel (to be processed) on the frame #1 input to the input section 1100 as a standard to estimate the position of a pixel (corresponding to the pixel on the frame #1) on the frame #2 and obtain a difference (sampling phase difference) θ 1102 between the sampling phase of the pixel on the frame #1 and the position of the pixel on the frame #2 input to the input section 1100. The sampling phase difference θ 1102 is equivalent to the motion vector information. The sampling phase difference θ 1102 can be calculated by motion detection processing.

The motion compensation and rate increasing unit 1115 has rate increasing units 1103 and 1104. The rate increasing units 1103 and 1104 perform motion compensation on the frame #2 by using the sampling phase difference θ 1102 to position the frame #2 with respect to the frame #1. The rate increasing units 1103 and 1104 increase the number of pixels of the frame #1 and the number of pixels of the frame #2 by twice to increase the pixel densities of image data pieces of the frames #1 and #2, respectively. The phase shift unit 1116 shifts the phases of the image data pieces having the increased pixel densities by respective constant quantities. The phase shift unit 1116 includes π/2 phase shifters 1106 and 1108, which are capable of shifting the phases of the image data pieces by respective constant quantities. The phase shift unit 1116 also includes delay compensators 1105 and 1107, which are capable of delaying the signals of the frames #1 and #2 having the increased pixel densities to compensate phase delays generated by the π/2 phase shifters 1106 and 1108. The alias component removing unit 1117 includes a coefficient determination unit 1109, multipliers 1110, 1111, 1112, and 1113, and an adder 1114. The coefficient determination unit 1109 generates coefficients C0, C1, C2, and C3 based on the sampling phase difference θ 1102. The multipliers 1110 multiplies a signal output from the delay compensator 1105 by the coefficient C0 generated by the coefficient determination unit 1109 to obtain the product. The multipliers 1111 multiplies a signal output from the π/2 phase shifter 1106 by the coefficient C1 generated by the coefficient determination unit 1109 to obtain the product. The multipliers 1112 multiplies a signal output from the delay compensator 1107 by the coefficient C2 generated by the coefficient determination unit 1109 to obtain the product. The multipliers 1113 multiplies a signal output from the π/2 phase shifter 1108 by the coefficient C3 generated by the coefficient determination unit 1109 to obtain the product. The adder 1114 calculates the sum of the products obtained by multipliers 1110 to 1113 to generate a signal (indicating the sum) to be output. The signal is output from the adder 1114 to the output section 1118. The output section 1118 then outputs the signal.

The position estimation 1101 may be configured by using a conventional technique. Details of the rate increasing units 1103 and 1104, the π/2 phase shifters 1106 and 1108, and the alias component removing unit 1117 will be described later.

Figure 14A:
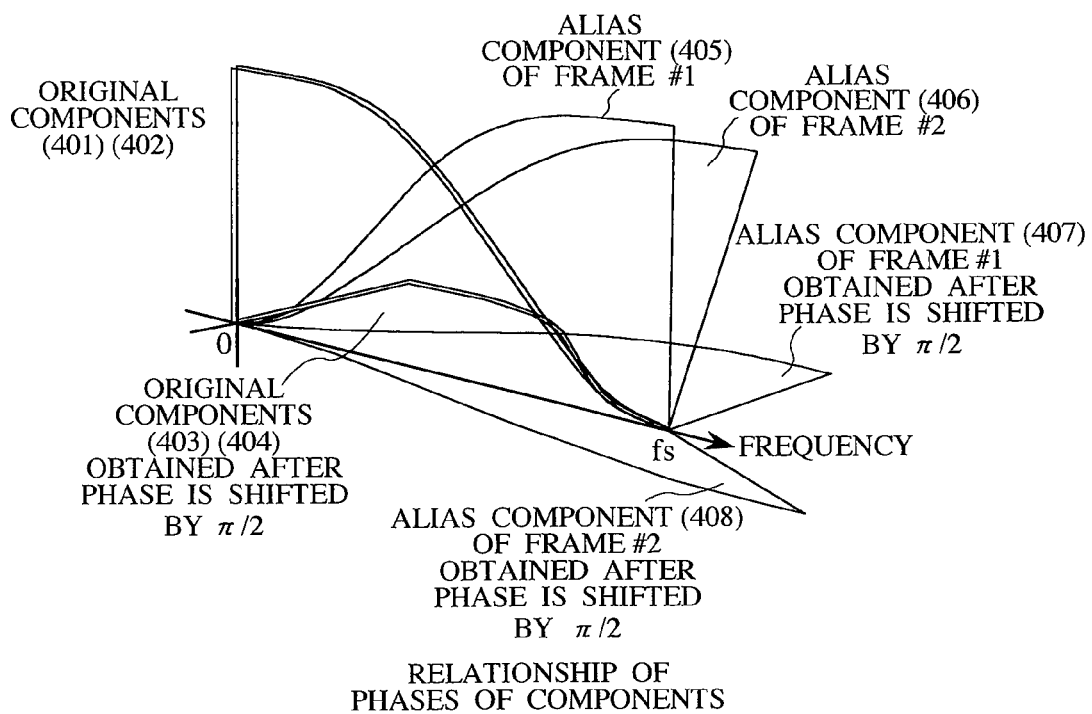
FIGS. 14A to 14C are diagrams showing the processing for increasing resolution according to the first embodiment.
Figure 14B:
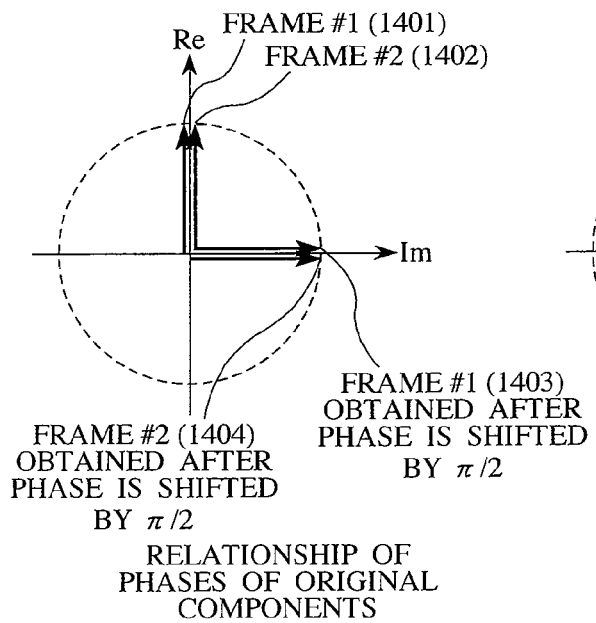
Figure 14C:
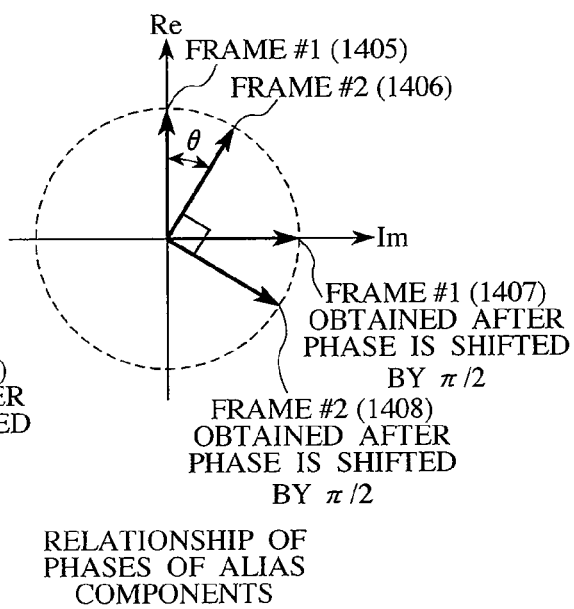

FIGS. 14A to 14C show operations of the image resolution increasing unit 6 (shown in FIG. 11) having the second configuration. FIGS. 14A to 14C show the signals output from the delay compensators 1105 and 1107, and the signals output from the π/2 phase shifters 1106 and 1108 in a one-dimensional frequency domain. In FIG. 14A, the signal (of the frame #1) having the increased pixel density and output from the delay compensator 1105 indicates the sum of the original component 1401 and an alias component 1405 generated based on the original sampling frequency (fs). Also, in FIG. 14A, the signal (of the frame #2) having the increased pixel density and output from the delay compensator 1107 indicates the sum of the original component 1402 and an alias component 1406 generated based on the original sampling frequency (fs). In this case, the phase of the alias component 1406 is shifted by the sampling phase difference θ 1102. The signal (of the frame #1) having the increased pixel density and output from the π/2 phase shifter 1106 indicates the sum of the original component 1403 obtained after the phase of the original component 1403 is shifted by π/2 and an alias component 1407 obtained after the phase of the alias component 1407 is shifted by π/2. The signal (of the frame #2) having the increased pixel density and output from the π/2 phase shifter 1108 indicates the sum of the original component 1404 obtained after the phase of the original component 1404 is shifted by π/2 and an alias component 1408 obtained after the phase of the alias component 1408 is shifted by π/2. FIGS. 14B and 14C respectively show the original components and the alias components, which are extracted from the drawing of FIG. 14A, in order to simplify the relationship of the phases of the components shown in FIG. 14A. It is possible to cancel out the alias components each other and only extract the original components by performing the following. That is, components in the Re axial direction are defined as 1, and components in the Im axial direction are defined as 0, in order to calculate the vector sum of the four original components shown in FIG. 14B, while components in the Re axial direction are defined as 0, and components in the Im axial direction are defined as 0, in order to calculate the vector sum of the four alias components shown in FIG. 14C. Then, a coefficient to be multiplied by each of the components is determined, and the weighted sum is performed on the components by using the determined coefficients. Therefore, an image signal processing device capable of doubling image resolution in a one-dimensional direction can be achieved by using only two frames (frame images). The method (described above) for determining a coefficient will be described in detail later.

FIG. 15 shows operations of the rate increasing units 1103 and 1104 included in the image resolution increasing unit 6 (shown in FIG. 11) having the second configuration. In FIG. 15, a frequency is plotted along the abscissa axis, and a gain (ratio of the amplitude of an output signal to the amplitude of an input signal) is plotted along the ordinate axis. FIG. 15 shows frequency versus gain characteristics of the rate increasing units 1103 and 1104. Each of the rate increasing units 1103 and 1104 doubles the number of pixels to increase the pixel density of image data by using a frequency (2fs) larger by twice than the sampling frequency (fs) of the original signal as a new sampling frequency and placing sampling points (=zero points) at respective central positions between the original pixels. In addition, each of the rate increasing units 1103 and 1104 perform filtering to pass a frequency component ranging from a frequency of −fs to a frequency of +fs in order to obtain the gain of 2.0. As shown in FIG. 15, the above operations are repeated for each frequency range of 2fs by integral multiple due to symmetry of the digital signal.

FIG. 16 shows a detail example of the rate increasing units 1103 and 1104 included in the image resolution increasing unit 6 having the second configuration shown in FIG. 11. FIG. 16 shows filer tap coefficients obtained by performing inverse Fourier transform on frequency components having characteristics shown in FIG. 15. The tap coefficients Ck (k is an integer) form a sinc function that is generally known. The sinc function is shifted by a value of −θ to compensate the sampling phase difference θ 1102. That is, Ck=2 sin(πk+θ)/(πk+θ). In the rate increasing unit 1103, the sampling phase difference θ 1102 is equal to zero, and Ck=2 sin(πk)/(πk). In addition, the sampling phase difference θ 1102 is expressed by a phase difference on an integer pixel basis (2π) and a phase difference on a sub-pixel basis. The sub-pixel is smaller than a single pixel. The phase difference on an integer pixel basis can be compensated by simple pixel shifting. The phase difference on a sub-pixel basis may be compensated by using filters of the rate increasing units 1103 and 1104.

Figure 17A:
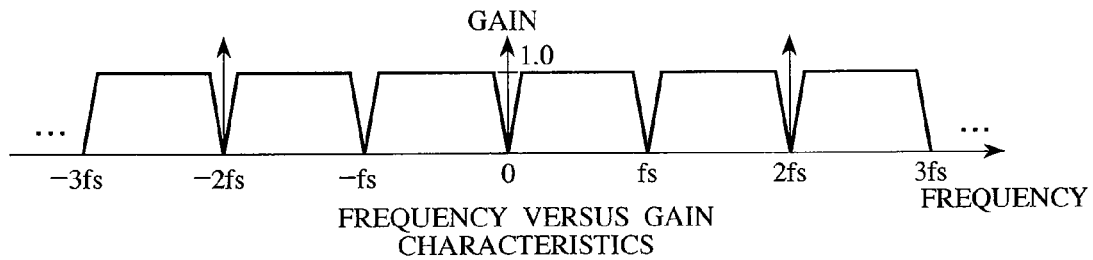
FIGS. 17A and 17B are graphs explaining a phase shift device according to the first embodiment.
Figure 17B:
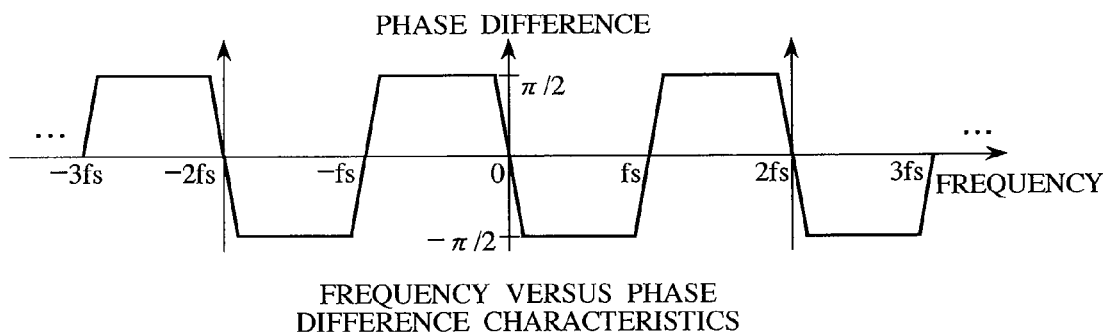

FIGS. 17A and 17B show operations of the π/2 phase shifter 1106 and 1108 included in the image resolution increasing unit 6 having the second configuration shown in FIG. 11. Generally known Hilbert transformers may be used as the π/2 phase shifter 1106 and 1108. In FIG. 17A, a frequency is plotted along the abscissa axis and a gain (ratio of the amplitude of an input signal to the amplitude of an output signal) is plotted along the ordinate axis. FIG. 17A shows frequency versus gain characteristics of the Hilbert transformers. Each of the Hilbert transformers uses a frequency (2fs) larger by twice than the sampling frequency (fs) of the original signal as a new sampling frequency and passes a frequency component ranging from a frequency of −fs to a frequency of +fs other than a frequency of 0 Hz in order to obtain the gain of 1.0. In FIG. 17B, a frequency is plotted along the abscissa axis, and a phase difference (between the phase of the input signal and the phase of the output signal) is plotted along the ordinate axis. FIG. 17B shows frequency versus phase difference characteristics of the Hilbert transformers. The phases of the frequency components within a frequency range from 0 to fs are delayed by π/2. The phases of the frequency components within a frequency range from 0 to −fs are forwarded by π/2. As shown in FIGS. 17A and 17B, the above operations are repeated for each frequency range of 2fs by integral multiple due to symmetry of the digital signal.

Figure 18:
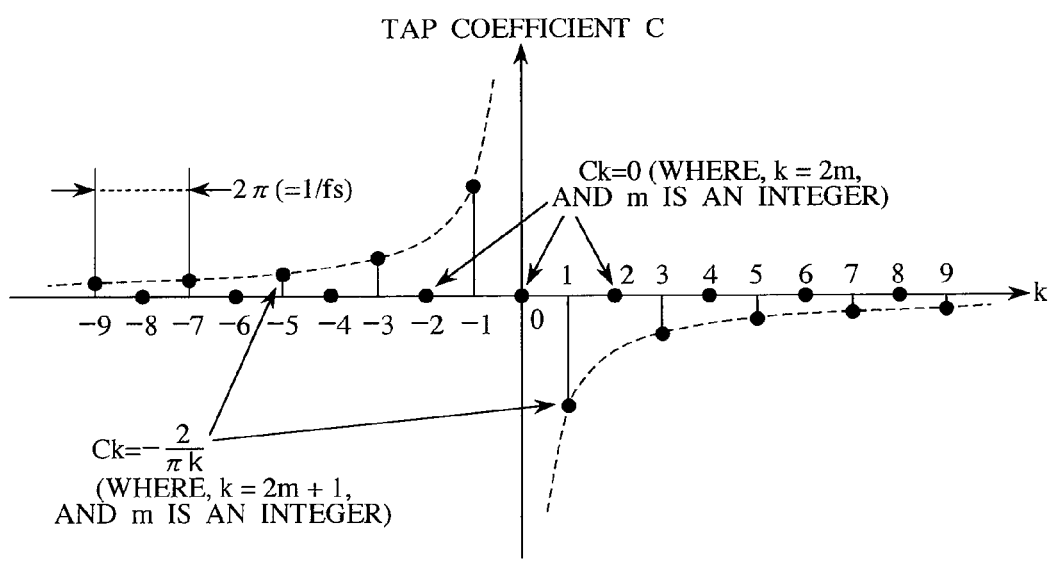
FIG. 18 is a graph explaining the phase shift device according to the first embodiment.

FIG. 18 shows the case where the Hilbert transformers are used as the π/2 phase shifters 1106 and 1108 included in the image resolution increasing unit 6 having the second configuration shown in FIG. 11. FIG. 18 shows filter tap coefficients obtained by performing inverse Fourier transformation on frequency components having characteristics shown in FIGS. 17A and 17B. In this case, each tap coefficient Ck is equal to zero when k=2m (m is an integer), and each tap coefficient Ck is −2/(πk) when k=2m+1.

Differentiators may be used as the π/2 phase shifters 1106 and 1108 used in the present embodiment. In this case, when each of the differentiators differentiates a general expression of cos(ωt+α), which shows a sine-wave, with respect to a time t and multiplies the differentiated expression by a value of 1/ω, the following expression is established: d(cos(ωt+α))/dt*(1/ω)=−sin(ωt+α)=cos(ωt+α+π/2). Therefore, the differentiators can achieve the functions of the π/2 phase shifters. Each of the differentiators may obtain the difference between a value of a target pixel and a value of a pixel adjacent to the target pixel, and uses a filter having frequency versus amplitude characteristics for the value of 1/ω to achieve the function of each of the π/2 phase shifters.

FIGS. 19A to 19D show a detail example of operations of the coefficient determination unit 109 included in the image resolution increasing unit 6 having the second configuration shown in FIG. 11. As described above, the components in the Re axial direction are defined as 1, and components in the Im axial direction are defined as 0, in order to calculate the vector sum of the four original components shown in FIG. 14B, while the components in the Re axial direction are defined as 0, and components in the Im axial direction are defined as 0, in order to calculate the vector sum of the four alias components shown in FIG. 14C. As shown in FIG. 19A, an image signal processing device capable of doubling resolution in a one-dimensional direction can be achieved by using only two frames (frame images) when coefficients to be multiplied by each of the components are determined. Simultaneous equations shown in FIG. 19B can be obtained based on the relationship of the phases of the components shown in FIGS. 14B and 14C when requirements shown in FIG. 19A are satisfied in the case where: C0 is a coefficient for a signal (indicating the sum of the original component and alias component of the frame #1 having the pixel density increased by the rate increasing unit 1103) output from the delay compensator 1105 shown in FIG. 11; C1 is a coefficient for a signal (indicating the sum of the π/2 phase-shifted original component and π/2 phase-shifted alias component of the frame #1 having the pixel density increased by the rate increasing unit 1103) output from the π/2 phase shifter 1106 shown in FIG. 11; C2 is a coefficient for a signal (indicating the sum of the original component and alias component of the frame #2 having the pixel density increased by the rate increasing unit 1104) output from the delay compensator 1107 shown in FIG. 11; and C3 is a coefficient for a signal (indicating the sum of the π/2 phase-shifted original component and π/2 phase-shifted alias component of the frame #2 having the pixel density increased by the rate increasing unit 1104) output from the π/2 phase shifter 1108 shown in FIG. 11. The simultaneous equations results in the relationships shown in FIG. 19C. The coefficient determination unit 1109 may output the coefficients C0, C1, C2, and C3 obtained in the abovementioned way. As an example, FIG. 19D shows the coefficients C0, C1, C2, and C3 obtained when the sampling phase difference θ 1102 is shifted from 0 to 2π at intervals of π/8. This corresponds to the case where the position of the signal of the original frame #2 is estimated with 1/16 pixels of accuracy and a motion in the frame #2 with respect to the frame #1 is compensated.

Although each of the rate increasing units 1103 and 1104 and the π/2 phase shifters 1106 and 1108 requires an infinite number of taps in order to obtain ideal characteristics, no practical problem arises even when the number of taps is limited for simplicity. In the case where the number of the taps is limited, a general window function (e.g., Hanning window function or Hamming window function) may be used. When a coefficient of each tap of the simplified Hilbert transformer is set to a value bilaterally symmetric with respect to C0 (i.e., C(−k)=−Ck (k is an integer)), the phase can be shifted by a constant quantity.

As described above, the image resolution increasing unit 6 (shown in FIG. 1) having the configuration shown in FIGS. 11 to 19D is capable of generating an image having higher resolution from a plurality of images.

Especially, the image resolution increasing unit 6 having the second configuration shown in FIG. 11 is capable of generating a single image having higher resolution from two images.

The image resolution increasing unit 6 may use the motion vectors included in the stream decoded by the decoder 5 to perform the processing for increasing resolution, as shown in FIG. 1. In this case, the motion detection processing to be performed by the position estimation unit 1101 included in the image resolution increasing unit 6 shown in FIG. 11 may not be required. This reduces the amount of data to be processed by the receiving device 101.

In the image transmission/reception system or the method for transmitting and receiving an image according to the first embodiment described above, the transmitting device 100 reduces the size of the image to reduce data to be transmitted, and the receiving device 101 increases the resolution and restores the image. In this case, the transmitting device 100 selectively performs low pass filtering based on the direction of a motion included in the image signal and generates an image signal including alias components that vary depending on the direction of the motion, and the receiving device 101 can increase the resolution and reduce the alias components.

In other words, the transmitting device 100 is capable of transmitting the image signal with a small amount of data, and receiving device 101 is capable of restoring the image having a higher image quality.

The transmitting device 100 included in the image transmission/reception system according to the first embodiment described above reduces the size of the image(s) while selectively performing low pass filtering based on the direction of a motion included in an image signal, and generates an image signal suitable for the receiving device 101 that generates a high-resolution image with minimized degradation in the image quality (the degradation in the image quality is caused by due to noise or the like). In addition, the transmitting device 100 is capable of transmitting image data encoded at a high compression rate.

The receiving device 100 included in the image transmission/reception system according to the first embodiment described above receives the image signal subjected to the low pass filtering for reducing alias components in a direction other than the direction in which a subject moves and alias components in the direction of the motion (the reduction in the alias components in the direction other than the direction of the motion is larger than the reduction in the alias components in the direction of the motion), reduces the alias components in the direction of the motion of the subject, increases the resolution, and generates a high-resolution image with minimized degradation in the image quality (the degradation is caused by due to noise or the like).

Second Embodiment

Figure 6:
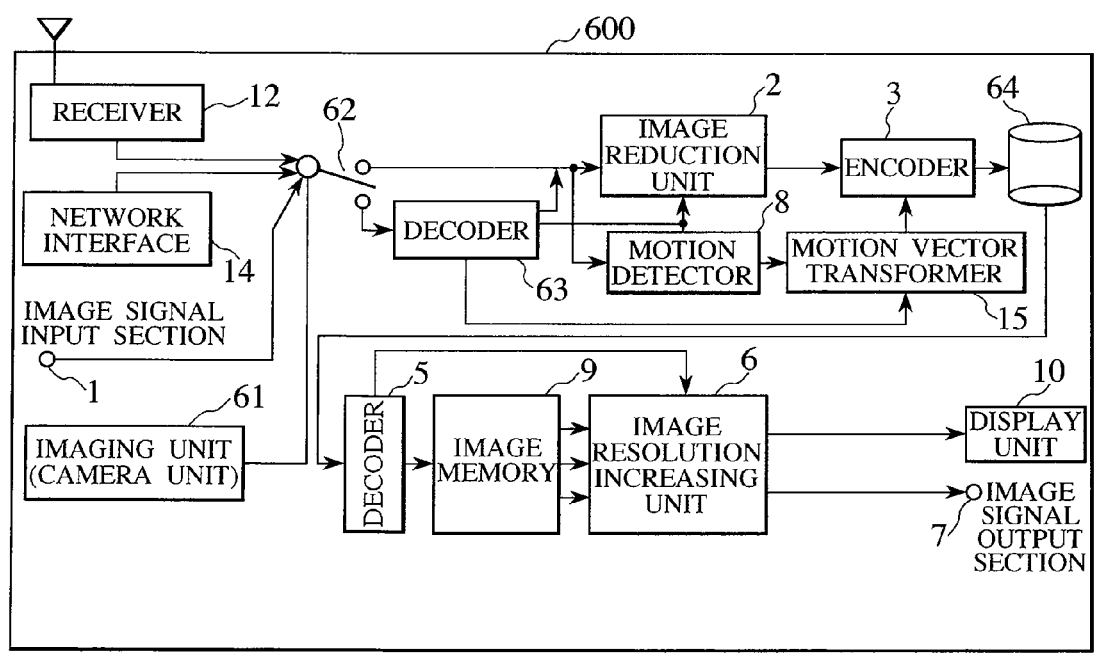
FIG. 6 is a diagram showing an example of the configuration of an image storage device according to a second embodiment of the present invention.

FIG. 6 shows an example of an image storage device 600 according to a second embodiment of the present invention. The receiver 12, the network interface 14, the decoder 5, the image resolution increasing unit 6, the image memory 9, the display unit 10, and the image signal output section 7, which are included in the image storage device 600, are the same as those provided in the receiving device 101 of the image transmission/reception system according to the first embodiment.

In addition, the image signal input section 1, the image reduction unit 2, the encoder 3, the motion detector 8, and the motion vector transformer 15, which are included in the image storage device 600, are the same as those provided in the transmitting device 100 of the image transmission/reception system according to the first embodiment.

The image storage device 600 receives an image signal from another external device by means of the image signal input section 1. The image storage device 600 may receive an image signal from another external device by means of any of the receiver 12, the network interface 14, and an imaging unit 61 such as a camera unit. For example, the image storage device 600 receives a television broadcast wave including an image signal by means of the receiver 12. In addition, the image storage device 600 receives an image signal from a server or the like through a network by means of the network interface 14. Furthermore, the imaging unit 61 images a subject by using a lens, an optical sensor or the like to generate an image signal.

Those image signals include an encoded stream and a non-encoded stream. The image storage device 600 has a switch 62 that receives signals from the receiver 12, the network interface 14, the image signal input section 1, and the imaging unit 61. When the switch 62 receives an encoded signal, the switch 62 outputs the encoded signal to a decoder 63. The decoder 63 decodes the encoded signal and outputs the decoded signal to the image reduction unit 2. On the other hand, when the switch 62 receives a non-encoded signal, the switch 62 outputs the non-encoded signal to the image reduction unit 2.

The motion detector 8 and the image reduction unit 2 perform operations in the same manner as those of the motion detector 8 and the image reduction unit 2 which are included in the transmitting device 100 of the image transmission/reception system according to the first embodiment. The image reduction unit 2 selectively performs low pass filtering based on the direction(s) of the motion vectors calculated by the motion detector 8 and reduces the size of each image included in the image signal.

In the image storage device 600 having another configuration, the image reduction unit 2 shown in FIG. 6 uses the motion vectors included in the encoded stream decoded by the decoder 63 to select the direction of a frequency component to be subjected to low pass filtering based on the direction(s) of the motion vectors. In this case, the image reduction unit 2 is capable of performing the low pass filtering based on the direction(s) of the motion vectors without the motion detector 8.

The encoder 3 shown in FIG. 6 encodes a signal. The encoder 3 may perform motion detection processing and use motion vectors to encode an image.

In the image storage device 600 having another configuration, the encoder 3 may use information on the motion vectors calculated by the motion detector 8. In this case, the size of each image included in the image signal used for the calculation of the motion vectors by the motion detector 8 is different from the size of an image included in the image signal encoded by the encoder 3. In such a manner as described in the first embodiment, the motion vector transformer 15 changes the number of the motion vectors (generated by the motion detector 8) and the length of each of the motion vectors based on the image reduction rate of the image reduction unit 2 to generate motion vectors that can be used by the encoder 3. When the encoder 3 uses the motion vectors generated by the motion vector transformer 15, motion detection processing to be performed by the encoder 3 is not necessary. This results in a reduction in the amount of data to be processed.

In the image storage device 600 having another configuration, the motion vector transformer 15 may change the motion vectors included in the stream decoded by the decoder 63 to generate motion vectors that can be used for encoding by the encoder 3.

A storage unit 64 included in the image storage device 600 stores the image signal encoded by the encoder 3.

As described above, the image storage device 600 according to the second embodiment reduces the size of an image included in an image signal and then stores the signal. The image storage device 600 is therefore capable of storing the image signal compressed at a higher compression rate than that in the case where the image signal is encoded and stored without a reduction in the size of the image.

Next, the decoder 5 shown in FIG. 6 decodes the encoded image signal stored in the storage unit 64. The decoded image signal is stored in the image memory 9. The image resolution increasing unit 6 performs the same processing as that in the first embodiment on a plurality of images included in the image signal stored in the image memory 9 to generate an image having high resolution. The processing performed by the image resolution increasing unit 6 is described in the first embodiment and a detail description thereof is omitted.

Lastly, the display unit 10 displays the generated high-resolution image. In addition, the image signal output section 7 outputs the generated high-resolution image to another external device.

The image resolution increasing unit 6 may use the motion vectors included in the encoded stream decoded by the decoder 5 to perform the processing for increasing resolution. In this case, the motion detection processing to be performed by the position estimation unit 1101 included in the image resolution increasing unit 6 shown in FIG. 11 may not be required in the second embodiment, in such a way as described in the first embodiment. This reduces the amount of data to be processed by the image storage device 600.

In the image storage device 600 according to the second embodiment described above, the image reduction unit 2 uses the motion vectors included in the stream decoded by the decoder 63 to select the direction of a frequency component to be subjected to low pass filtering based on the direction(s) of the motion vectors. The motion vector transformer 15 may use the motion vectors included in the stream decoded by the decoder 63 to generate motion vectors that can be used for encoding by the encoder 3. The image resolution increasing unit 6 may use the motion vectors included in the stream decoded by the decoder 5 to perform the processing for increasing the resolution. In this case, the image storage device 600 can perform the abovementioned operations without the motion detection processing. Therefore, a hardware device for performing the motion detection processing is not required for the image storage device 600. It is therefore possible to realize, at a low cost, the image storage device 600 capable of storing an image signal compressed at a higher compression rate and generating a high-resolution image with minimized degradation in the image quality (the degradation in the image quality is caused by due to noise or the like).

As described above, the image storage device 600 according to the second embodiment reduces the size of an image included in a received image signal, performs low pass filtering to reduce alias components in a direction other than the direction of a motion included in the image and alias components in the direction of the motion, encodes the image signal to compress the image signal and reduce the amount of data of the image signal, and stores the encoded image signal in the storage unit. In this case, the amount of the reduced alias components in the direction other than the direction of the motion is larger than that of the reduced alias components in the direction of the motion. In addition, the image storage device 600 is capable of generating a high-resolution image with minimized degradation in the image quality by decoding the image signal stored in the storage unit and increasing the resolution with a reduction in the alias components in the direction of the motion.

Furthermore, the image storage device 600 is capable of displaying or outputting the high-resolution image with minimized degradation in the image quality (the degradation in the image quality is caused by due to noise or the like) after encoding the image signal at a high rate and storing the encoded image signal.

Third Embodiment

Figure 7:
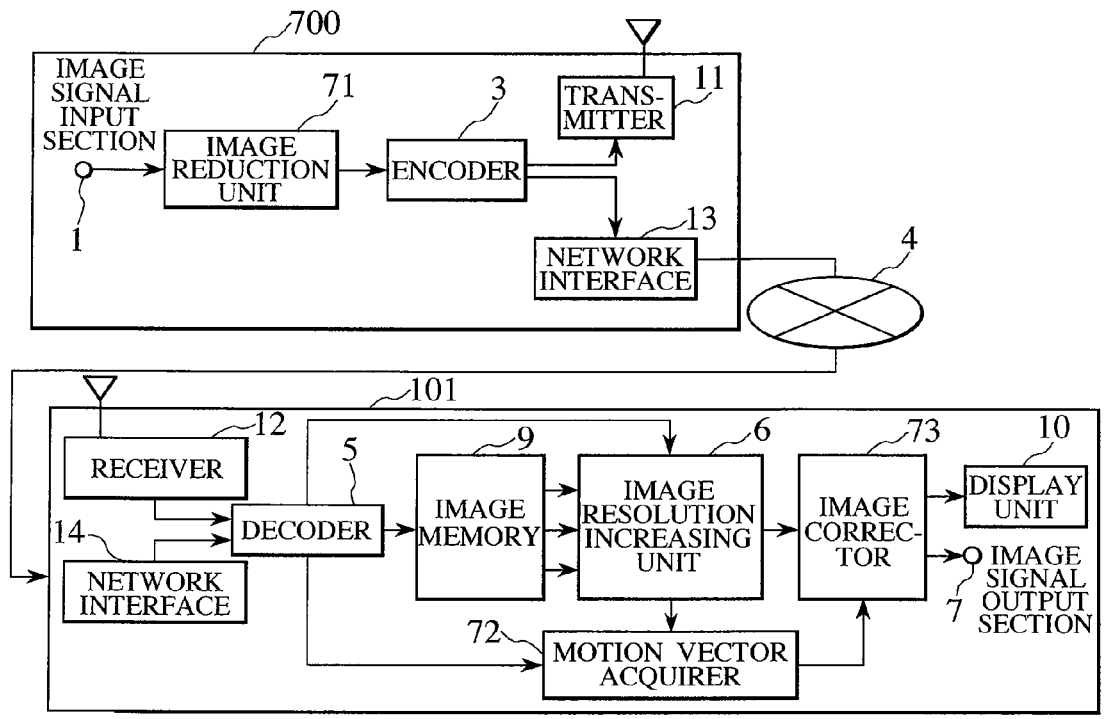
FIG. 7 is a diagram showing an example of the configuration of an image transmission/reception system according to a third embodiment of the present invention.

FIG. 7 shows an example of an image transmission/reception system according to a third embodiment of the present invention. The image transmission/reception system according to the third embodiment includes a transmitting device 700 and a receiving device 701. The image transmission/reception system according to the third embodiment is different from the image transmission/reception system according to the first embodiment. In the image transmission/reception system according to the third embodiment, the low pass filtering that is selectively performed based on the direction of a motion included in an image is not performed in the transmitting device 700. The transmitting device 700 reduces the sizes of the images and transmits an image signal including the reduced images. The receiving device 701 performs processing for increasing resolution of the reduced images transmitted by the transmitting device 700 and then performs low pass filtering on the image signal to pass a low frequency component in a direction other than the direction of a motion included in the images. The receiving device 701 is therefore capable of generating a high-resolution image with minimized degradation in the image quality (the degradation in the image quality is caused by due to noise or the like).

The transmitting device 700 according to the third embodiment has an image reduction unit 71 that is different from the image reduction unit 2 included in the transmitting device 100 according to the first embodiment. That is, the image reduction unit 71 does not perform the low pass filtering based on the direction of a motion included in images and generates a reduced image having an alias component.

Other parts of the transmitting device 700 according to the third embodiment are the same as those of the transmitting device 100 according to the first embodiment, and description thereof is omitted.

In such a manner as described in the first embodiment, the image resolution increasing unit 6 may use the motion vectors included in the encoded stream decoded by the decoder 5 to perform the processing for increasing resolution. In this case, the motion detection processing to be performed by the position estimation unit 1101 included in the image resolution increasing unit 6 shown in FIG. 11 may not be required. This reduces the amount of data to be processed by the receiving device 701.

The receiving device 701 according to the third embodiment has a motion vector acquirer 72 and an image corrector 73, which are not included in the receiving device 101 according to the first embodiment.

The motion vector acquirer 72 acquires information (motion vector information) on motion vectors included in the image signal decoded by the decoder 5. The motion vector information is included in an encoded stream generated by the encoder 3 included in the transmitting device 700.

In addition, the motion vector acquirer 72 acquires motion vector information (sampling phase difference θ 1102) calculated by the position estimation unit 1101 included in the image resolution increasing unit 6.

The motion vector information acquired by the motion vector acquirer 72 is obtained by a calculation of the sizes of images obtained before the image resolution increasing unit 6 performs the processing for increasing resolution. The motion vector acquirer 72 therefore performs processing for changing the sizes of the motion vectors based on the rate of enlarging the size of the image in the processing (for increasing resolution) performed by the image resolution increasing unit 6 to ensure that the motion vector information acquired by the motion vector acquirer 72 can be used for the size of the image obtained after the image resolution increasing unit 6 performs the processing. The motion vector acquirer 72 outputs, to the image corrector 73, information on the motion vectors subjected to the processing (for changing the sizes of the motion vectors).

Since the motion vector acquirer 72 acquires the motion vector information and performs the processing for changing the sizes of the motion vectors, the image corrector 73 uses the motion vectors and reduces the amount of data to be processed. This results from the fact that the image corrector 73 does not need to perform motion detection processing.

The image corrector 73 performs processing for correcting the high-resolution image generated by the image resolution increasing unit 6. Details of the processing will be described below.

The transmitting device 700 does not perform low pass filtering on an image signal (to be transmitted to the receiving device 701) based on the direction of a motion included in an image. Therefore, an image signal input to the image resolution increasing unit 6 includes alias components in directions in the image.

The image resolution increasing unit 6 reduces the alias components in the direction of a motion included in the image signal and increases resolution in the direction of the motion. Although alias components in the direction of the motion included in the high-resolution image generated by the image resolution increasing unit 6 are reduced, alias components in a direction other than the direction of the motion included in the high-resolution image are not reduced and remain.

The image corrector 73 performs low pass filtering on the high-resolution image generated by the image resolution increasing unit 6 to reduce alias components. However, if the image corrector 73 performs the low pass filtering on an image signal including the image to pass a low frequency component in the direction of a motion included in the image, a high frequency component obtained after the image resolution increasing unit 6 increases the resolution is removed. This reduces the effect of the processing for increasing the resolution by means of the image resolution increasing unit 6.

To prevent the reduction in the effect, the image corrector 73 according to the third embodiment uses the motion vectors acquired by the motion vector acquirer 72 to perform appropriate low pass filtering to pass a low frequency component in a direction other than the direction of the motion included in the image. The image corrector 73 according to the third embodiment is therefore capable of reducing the remaining alias components and generating a high-resolution image with minimized degradation in the image quality (the degradation in the image quality is caused by due to noise or the like) while maintaining the effect of the processing for increasing the resolution by means of the image resolution increasing unit 6.

Next, a description will be made of details of the image corrector 73 included in the receiving device 701 according to the third embodiment with reference to FIG. 8.

The image signal received by the image corrector 73 is input in parallel to each of spatial low pass filters 81 having respective characteristics different from each other. Each of the spatial low pass filters 81 outputs a signal to a selector 82. The selector 82 selects one of the signals output from the low pass filters 81 and outputs the selected signal. The low pass filters 81 have respective different characteristics of frequency ranges to be limited and directions similar to the low pass filters 21 in the first embodiment. In this case, the selector 82 uses information on the motion vectors input to the selector 82 from the motion vector acquirer 72 to perform the low pass filtering in order to limit a frequency range of a frequency component in a direction other than the direction of a motion included in the images of the image signal based on the signals output from the low pass filters 81.

The image signal received by the image corrector 73 includes alias components in a direction other than the direction of the motion included in the images of the image signal. Since the selector 82 performs the abovementioned processing, the receiving device 701 according to the third embodiment is capable of reducing alias components in the direction other than the direction of the motion included in the images of the image signal while maintaining a high frequency component in the direction of the motion of the image subjected to the processing (for increasing resolution) performed by the image resolution increasing unit 6. The receiving device 701 is therefore capable of generating a high-resolution image with minimized degradation in the image quality (the degradation in the image quality is caused by due to noise or the like).

The image corrector 73 according to the third embodiment is different from the image reduction unit 2 according to the first embodiment and does not perform the processing for reducing the size of an image. The selector 82 included in the image corrector 73 is different from the selector 22 included in the image reduction unit 2 and does not perform the processing for subsampling pixels.

Figure 8:
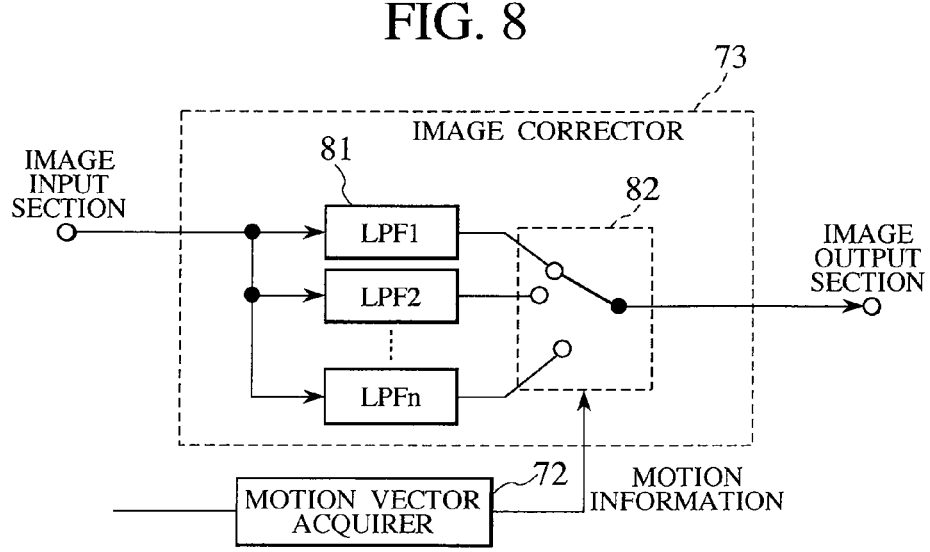
FIG. 8 is a diagram showing an example of the configuration of an image correction unit according to the third embodiment.
Figure 9:
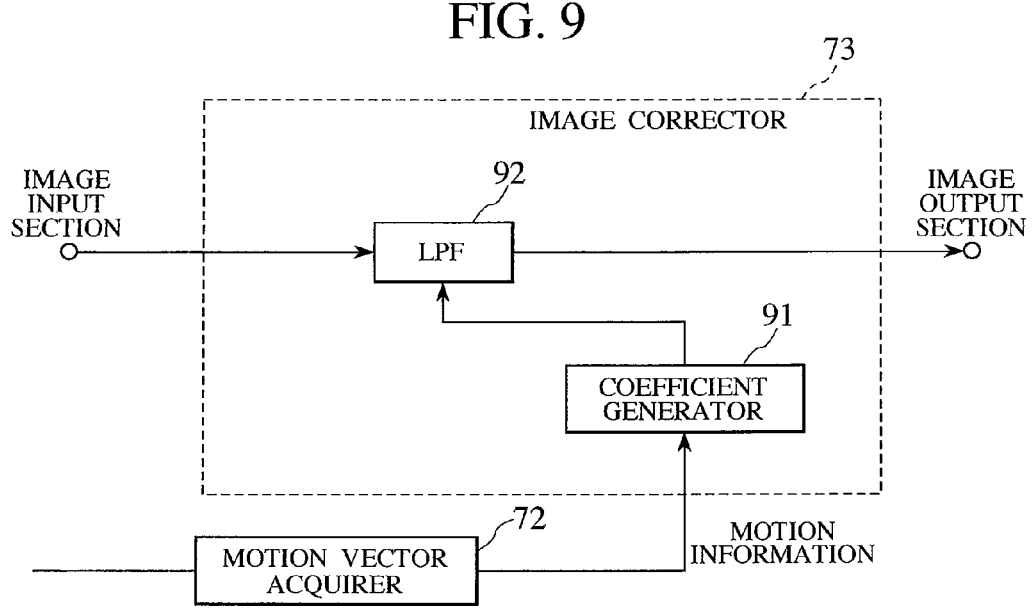
FIG. 9 is a diagram showing another example of the configuration of the image correction unit according to the third embodiment.

The image corrector 73 according to the third embodiment may have a configuration shown in FIG. 9. The image corrector 73 having the configuration shown in FIG. 9 includes a coefficient generator 91 and a spatial low pass filter 92. The coefficient generator 91 performs the same processing as that performed by the coefficient generator 41 (shown in FIG. 4) according to the first embodiment. The spatial low pass filter 92 performs the same processing as that performed by the spatial low pass filter 42 (shown in FIG. 4) according to the first embodiment. Specifically, the coefficient generator 91 generates coefficients for the spatial low pass filter 92 based on the motion vector information received by the coefficient generator 91 from the motion vector acquirer 72. The coefficients correspond to those of the low pass filter 1, the low pass filter 2 and the like (which are the low pass filters 81) shown in FIG. 8. The spatial low pass filter 92 switches a set coefficient(s) to the coefficients generated by the coefficient generator 91.

The coefficient generator 91 and the spatial low pass filter 92 shown in FIG. 9 can therefore perform operations similar to those of the spatial low pass filters 81 and the selector 82 shown in FIG. 8. In the image corrector 73 having the configuration shown in FIG. 9, multiple types of spatial low pass filters is not required. The image corrector 73 can be achieved with a simpler hardware configuration.

In the receiving device 701 included in the image transmission/reception system according to the third embodiment described above, the image resolution increasing unit 6 uses the motion vectors included in the stream decoded by the decoder 5 to perform the processing for increasing resolution, and the image corrector 73 uses motion vectors obtained by changing the sizes of the motion vectors (included in the stream decoded by the decoder 5) by means of the motion vector acquirer 72 to select the direction of a frequency component to be subjected to the low pass filtering. In this case, the receiving device 701 shown in FIG. 7 can perform the abovementioned operations without the motion detection processing. Therefore, a hardware device for performing the motion detection processing is not required for the receiving device 701. It is therefore possible to realize, at a low cost, the receiving device 701 capable of generating a high-resolution image with minimized degradation in the image quality (the degradation in the image quality is caused by due to noise or the like).

In the image transmission/reception system or the method for transmitting and receiving an image according to the third embodiment described above, the transmitting device 700 reduces the size of each image to reduce data to be transmitted, and the receiving device 701 increases the resolution and restores the image. In this case, the transmitting device 700 is capable of outputting the image signal including alias components, and the receiving device 701 is capable of performing the processing for increasing the resolution by using the alias components. The receiving device 701 increases resolution in the direction of the motion included in the images of the image signal by using alias components and performs low pass filtering to reduce alias components in a direction other than the direction of the motion. The receiving device 701 is therefore capable of generating a high-resolution image with minimized degradation in the image quality of the image (the degradation in the image quality is caused by due to noise or the like).

That is, it is possible to transmit the image signal with a small amount of data from the transmitting device and restore an image having higher resolution by the receiving device.

The transmitting device 700 included in the image transmission/reception system according to the third embodiment described above reduces the size of each of the images included in the image signal to reduce the amount of data to be transmitted and outputs the image signal including alias components. It is therefore possible to transmit the image signal (that can be processed to increase the resolution by using alias components in the receiving device) by using a small amount of data.

The receiving device 701 included in the image transmission/reception system according to the third embodiment described above receives the image signal including the alias components and reduces the alias components in the direction of a motion included in the images to increase the resolution. In addition, the receiving device 701 performs low pass filtering on the image signal to pass a low frequency component in a direction other than the direction of the motion to reduce alias components. The receiving device 701 is therefore capable of generating a high-resolution image with minimized degradation in the image quality (the degradation in the image quality is caused by due to noise or the like).

Fourth Embodiment

Figure 10:
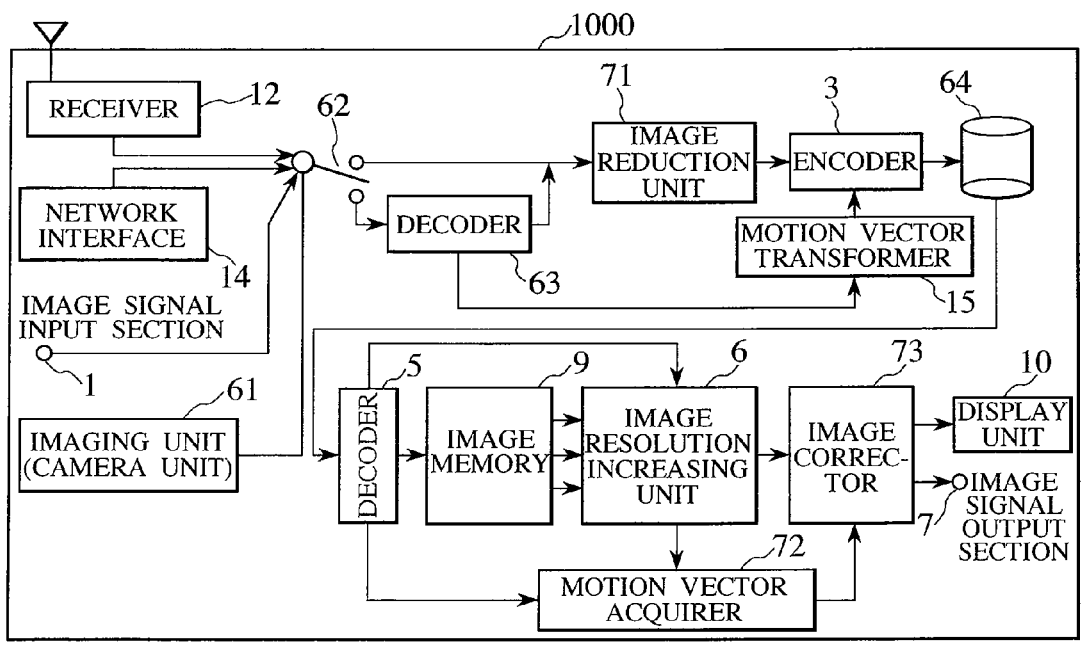
FIG. 10 is a diagram showing another example of the configuration of the image storage device according to a fourth embodiment of the present invention.

FIG. 10 shows an example of an image storage device 1000 according to a fourth embodiment of the present invention. The image storage device 1000 is different from the image storage device 600 according to the second embodiment. The image storage device 1000 reduces the size of each of images without performing the selective low pass filtering based on the direction of a motion included in the images before an image signal including the images is stored in a storage unit 64. The image storage device 1000 performs processing for increasing resolution of the reduced images and performs the low pass filtering to pass a low frequency component in a direction other than the direction of the motion. The image storage device 1000 is capable of generating a high-resolution image with minimized degradation in the image quality (the degradation in the image quality is caused by due to noise or the like) in order to reproduce the image stored in storage unit 64.

The image signal input section 1, the receiver 12, the network interface 14, the imaging unit 61, the switch 62, the decoder 63, the storage unit 64, the encoder 3, the decoder 5, the image resolution increasing unit 6, the image memory 9, the display unit 10, and the image signal output section 7, which are included in the image storage device 1000, are the same as those included in the image storage unit 600 according to the second embodiment, and description thereof is omitted.

Next, a description will be made of differences between the image storage device 1000 according to the fourth embodiment and the image storage device 600 according to the second embodiment.

Operations of the image signal input section 1, the receiver 12, the network interface 14, the imaging unit 61, the switch 62, and the decoder 63, which are included in the image storage device 1000, are the same as those in the image storage device 600 according to the second embodiment.

The image reduction unit 71 included in the image storage device 1000 is the same as that included in the transmitting device 700 according to the third embodiment, and therefore different from the image reduction unit 2 included in the image storage device 600 according to the second embodiment. The image reduction unit 71 does not perform low pass filtering based on a motion included in images and generates reduced images including alias components.

The encoder 3 encodes an image signal including the reduced images generated by the image reduction unit 71 and outputs the encoded image signal to the storage unit 64. The storage unit 64 stores the encoded image signal.

In the image storage device 1000 having another configuration, the motion vector transformer 15 changes the sizes of motion vectors included in a stream decoded by the decoder 63, and the encoder 3 may use the motion vectors to encode the image signal.

As described above, the image storage device 1000 according to the fourth embodiment reduces the size of each image included in an image signal and then stores the image signal. The image storage device 1000 is therefore capable of storing the image signal compressed at a higher compression rate than that in the case where the image signal is encoded and stored without a reduction in the size of the image.

The decoder 5 decodes the encoded image signal stored in the storage unit 64. The decoded image signal is stored in the image memory 9. The image resolution increasing unit 6 performs the processing, which is the same as that in the first embodiment, on a plurality of images included in the image signal stored in the image memory 9 to generate an image having high resolution. The processing performed by the image resolution increasing unit 6 is described above in the first embodiment, and description thereof is omitted.

In such a manner as described in the first embodiment, the image resolution increasing unit 6 may use the motion vectors included in the encoded stream decoded by the decoder 5 to perform the processing for increasing the resolution. In this case, the motion detection processing to be performed by the position estimation unit 1101 included in the image resolution increasing unit 6 shown in FIG. 11 is not required. This reduces the amount of data to be processed in the image storage device 1000.

The alias components remain in the image signal stored in the storage unit 64 included in the image storage device 1000 according to the fourth embodiment regardless of the direction of a motion. Although the image resolution increasing unit 6 performs the processing for increasing resolution in the direction of the motion and reducing alias components in the direction of the motion, alias components in a direction other than the direction of the motion remain in the image signal.

In the image storage device 1000 according to the fourth embodiment, the image corrector 73 performs the same processing as that performed by the image corrector 73 included in the receiving device 701 according to the third embodiment. That is, the image corrector 73 performs the low pass filtering to pass a low frequency component in a direction other than the direction of a motion included in the image signal to reduce alias components. Details of the image corrector 73 are described above in the third embodiment, and description of the image corrector 73 according to the fourth embodiment is omitted.

The processing performed by the motion vector acquirer 72 included in the image storage device 1000 is the same as that performed by the motion vector acquirer 72 included in the receiving device 701 according to the third embodiment, and description thereof is omitted.

Lastly, the display unit 10 displays the generated high-resolution image. Alternatively, the image signal output section 7 outputs the generated high-resolution image to another external device.

In the image storage device 1000 according to the fourth embodiment described above, for example, the encoder 3 encodes an image signal by using motion vectors obtained by transforming, by means of the motion vector transformer 15, motion vectors included in the stream decoded by the decoder 63; the image resolution increasing unit 6 performs the processing for increasing resolution by using the motion vectors included in the stream decoded by the decoder 5; the image corrector 73 selects the direction of a frequency component to be subjected to low pass filtering by using the motion vectors (included in the stream decoded by decoder 5) obtained by the transforming by means of the motion vector transformer 15. In this case, the image storage device 1000 shown in FIG. 10 can perform the abovementioned operations without the motion detection processing. Therefore, a hardware device for performing the motion detection processing is not required for the image storage device 1000. It is therefore possible to realize, at a low cost, the image storage device 1000 capable of storing an image signal compressed at a higher compression rate and generating a high-resolution image with minimized degradation in the image quality (the degradation in the image quality is caused by due to noise or the like).

As described above, the image storage device 1000 according to the fourth embodiment reduces the size of each image included in a received image signal and encodes the image signal including alias components. The encoded image signal having a small amount of data can be stored in the storage unit. In addition, the image storage device 1000 is capable of decoding the image signal stored in the storage unit, and reducing alias components in the direction of a motion included in the image signal to increase resolution. Furthermore, the image storage device 1000 is capable of performing low pass filtering to pass a low frequency component in a direction other than the direction of the motion included in the image signal to reduce alias components, and generating a high-resolution image with minimized degradation in the image quality (the degradation in the image quality is caused by due to noise or the like).

In addition, the image storage device 1000 according to the fourth embodiment described above reduces the size of the image included in the image signal, stores the image signal compressed at a higher compression rate, and then displays or outputs the high-resolution image with minimized degradation in the image quality (the degradation in the image quality is caused by due to noise or the like).

While we have shown and described several embodiments in accordance with our invention, it should be understood that the disclosed embodiment is susceptible to changes and modifications without departing from the scope of the invention. Therefore, we do not intend to be bound by the details shown and described herein but intend to cover all such changes and modifications as fall within the ambit of the appended claims.

What is claimed is:

1. A method for transmitting and receiving an image signal by means of a transmitting device for transmitting the image signal and a receiving device for receiving the image signal, the method comprising:
   an image reduction step of reducing an image included in the image signal and generating an image signal including the reduced image by means of the transmitting device;
   a transmitting step of transmitting the image signal including the reduced image by means of the transmitting device;
   a receiving step of receiving the image signal transmitted by the transmitting device by means of the receiving device; and
   an image resolution increasing step of using an alias component and information on motion that are included in the received image signal to convert the received image signal into an image having high resolution by means of the receiving device,
   wherein:
   in the image reduction step, processing for reducing an image and applying low pass filtering using one or more low pass filters having cut-off frequencies is performed on the image signal to cut off one or more high frequency components in the direction of the motion that is included in the image signal; and
   the cut-off frequency of a low pass filter for the image signal in a direction other than the direction of the motion is lower than the cut-off frequency of a low pass filter for the image signal in the direction of the motion.

2. The method according to claim 1, wherein in the image resolution increasing step, the receiving device performs processing for increasing the resolution in the direction of the motion included in the image signal.

3. A receiving device comprising:
   a receiver which receives an encoded stream including an image signal resulting from image reduction processing;
   a decoder which decodes the encoded stream received by the receiver;
   an image resolution increasing unit which performs processing on the image signal decoded by the decoder to increase resolution by using an alias component and motion information that are included in the image signal in order to generate a high-resolution image; and
   an image corrector which performs low pass filtering on an image signal including the high-resolution image generated by the image resolution increasing unit,
   wherein:
   the image resolution increasing unit performs the processing for increasing the resolution in the direction of motion that is included in the image signal;
   the image corrector performs the low pass filtering using one or more low pass filters having cut-off frequencies on the image signal to cut off one or more high frequency components, both in the direction of the motion that is included in the image signal and in a direction other than the direction of the motion that is included in the image signal; and
   the cut-off frequency of a low pass filter for the image signal in a direction other than the direction of the motion is lower than the cut-off frequency of a low pass filter for the image signal in the direction of the motion.

4. The receiving device according to claim 3, wherein:
the motion information that is included in the encoded stream decoded by the decoder is used for the processing for increasing the resolution by the image resolution increasing unit; and
the image corrector selects the direction of frequency components for the low pass filtering by using the motion information that is included in the encoded stream decoded by the decoder.

5. An image storage device comprising:
an image reduction unit which reduces the size of an image included in an image signal and generates an image signal including the reduced image;
a storage unit which stores the image signal having the reduced image; and
an image resolution increasing unit which converts the image signal into a high-resolution image by using an alias component and motion information that are included in the image signal stored in the storage unit,
wherein:
the image reduction unit performs processing for reducing the size of an image and low pass filtering using one or more low pass filters having cut-off frequencies on the image signal to cut off a high frequency component in the direction of the motion that is included in the image signal; and
the cut-off frequency of a low pass filter for the image signal in a direction other than the direction of the motion is lower than the cut-off frequency of a low pass filter for the image signal in the direction of the motion.

6. The image storage device according to claim 5, wherein the image resolution increasing unit performs the processing for increasing the resolution in the direction of the motion included in the image signal.

7. A receiving device comprising:
a receiver which receives an encoded stream including an image signal resulting from image reduction processing;
a decoder which decodes the encoded stream received by the receiver;
an image resolution increasing unit which performs processing on the image signal decoded by the decoder to increase resolution by using an alias component and motion information that are included in the image signal in order to generate a high-resolution image; and
an image corrector which performs low pass filtering on an image signal including the high-resolution image generated by the image resolution increasing unit,
wherein:
the image resolution increasing unit performs the processing for increasing the resolution in the direction of motion that is included in the image signal;
the image corrector performs low pass filtering on the image signal to pass one or more low frequency components only in a direction other than the direction of the motion that is included in the image signal; and
the image corrector does not perform low pass filtering on the image signal in the direction of the motion.

* * * * *